(12) United States Patent
Wang

(10) Patent No.: US 12,041,677 B2
(45) Date of Patent: Jul. 16, 2024

(54) DATA TRANSMISSION METHOD AND APPARATUS FOR REDUCING RECONFIGURATION DELAY IN LINK FAILURE

(71) Applicant: Huawei Technologies Co., Ltd., Shenzhen (CN)

(72) Inventor: Gang Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 518 days.

(21) Appl. No.: 17/325,432

(22) Filed: May 20, 2021

(65) Prior Publication Data

US 2021/0274584 A1 Sep. 2, 2021

Related U.S. Application Data

(63) Continuation of application No. PCT/CN2018/116766, filed on Nov. 21, 2018.

(51) Int. Cl.
*H04W 76/19* (2018.01)
*H04L 1/1867* (2023.01)
(Continued)

(52) U.S. Cl.
CPC .......... *H04W 76/19* (2018.02); *H04L 1/1896* (2013.01); *H04W 76/15* (2018.02); *H04W 84/18* (2013.01)

(58) Field of Classification Search
CPC ..... H04W 76/19; H04W 76/15; H04W 84/18; H04W 36/0069; H04L 1/1896
See application file for complete search history.

(56) References Cited

U.S. PATENT DOCUMENTS

2016/0212753 A1* 7/2016 Wu .................. H04L 5/0032
2018/0124642 A1* 5/2018 Phuyal ............. H04L 1/1614
(Continued)

FOREIGN PATENT DOCUMENTS

CN 105519182 A 4/2016
CN 105813121 A 7/2016
(Continued)

OTHER PUBLICATIONS

Qualcomm Inc., "SCG failure handling for split bearer", 3GPP TSG-RAN WG2 Meeting #102 Busan, R2-1808174 (Resubmission of R2-1803405), Busan, South Korea, May 21-25, 2018, 4 pages.
(Continued)

*Primary Examiner* — Deepa Belur
(74) *Attorney, Agent, or Firm* — Slater Matsil, LLP

(57) ABSTRACT

Embodiments of this application disclose a data transmission method and apparatus, and relate to the field of communications technologies, to resolve a conventional-technology problem that when an SCG fails, a delay is increased because related data is processed only when a network side resumes transmission of data on an SCG-related bearer by using a reconfiguration message. A specific solution is: transmitting, by an apparatus, a first data packet over a second link; and if determining that the second link fails, sending, by the apparatus, to-be-transmitted data packets to a first base station over a first link before the apparatus receives a reconfiguration message from the first base station, where the to-be-transmitted data packets include a data packet whose reception is not acknowledged as a success and that is in the first data packet, and the reconfiguration message is used to indicate a reconfigured link.

18 Claims, 8 Drawing Sheets

(51) Int. Cl.
*H04W 76/15* (2018.01)
*H04W 84/18* (2009.01)

(56) References Cited

U.S. PATENT DOCUMENTS

| | | | |
|---|---|---|---|
| 2018/0184475 A1 | 6/2018 | Babaei et al. | |
| 2019/0182883 A1* | 6/2019 | He | H04W 76/27 |
| 2019/0254100 A1* | 8/2019 | Yu | H04W 76/18 |
| 2020/0053826 A1* | 2/2020 | Shi | H04W 76/34 |
| 2020/0106700 A1* | 4/2020 | Jo | H04W 40/02 |
| 2021/0099977 A1* | 4/2021 | Dalmiya | H04W 28/0864 |
| 2021/0153281 A1* | 5/2021 | Deogun | H04W 76/16 |
| 2023/0217398 A1* | 7/2023 | Kim | H04B 7/06964 |
| | | | 370/503 |
| 2023/0276296 A1* | 8/2023 | Kim | H04W 28/0278 |
| | | | 370/235 |
| 2023/0309179 A1* | 9/2023 | Ingale | H04W 36/00698 |
| 2023/0345582 A1* | 10/2023 | Sharma | H04W 80/02 |

FOREIGN PATENT DOCUMENTS

| | | |
|---|---|---|
| CN | 108617029 A | 10/2018 |
| WO | 2016021890 A1 | 2/2016 |
| WO | WO-2018006253 A1 * 1/2018 ............ H04W 76/18 |
| WO | 2018203710 A1 | 11/2018 |
| WO | 2019061856 A1 | 4/2019 |

OTHER PUBLICATIONS

Qualcomm Inc., "UL path switch upon SCG failure", 3GPP TSG-RAN WG2 Meeting #100, R2-1713640, Reno, NV, USA, Nov. 27-Dec. 1, 2017, 1 page.
Samsung, "Radio link failure during the CS fallback process", 3GPP TSG-RAN WG2 Meeting #94, R2-163394, Nanjing, China, May 23-27, 2016, 8 pages.
3GPP TS 36.323 V15.1.0, (Sep. 2018), 3rd Generation Partnership Project; Technical Specification Group Radio Access Network; Evolved Universal Terrestrial Radio Access (E-UTRA); Packet Data Convergence Protocol (PDCP) specification (Release 15), 51 pages.
3GPP TS 36.321 V15.3.0, (Sep. 2018), 3rd Generation Partnership Project; Technical Specification Group Radio Access Network; Evolved Universal Terrestrial Radio Access (E-UTRA); Medium Access Control (MAC) protocol specification (Release 15), 127 pages.
3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 15), 918 pages.
3GPP TS 36.133 V15.4.0, (Sep. 2018), 3rd Generation Partnership Project; Technical Specification Group Radio Access Network; Evolved Universal Terrestrial Radio Access (E-UTRA); Requirements for support of radio resource management (Release 15), 3227pages.

* cited by examiner

DATA TRANSMISSION METHOD AND APPARATUS FOR REDUCING RECONFIGURATION DELAY IN LINK FAILURE

CROSS-REFERENCE TO RELATED APPLICATIONS

This application is a continuation of International Application No. PCT/CN2018/116766, filed on Nov. 21, 2018, the disclosure of which is hereby incorporated by reference in its entirety.

TECHNICAL FIELD

Embodiments of this application relate to the field of communication technologies, and in particular, to a data transmission method and an apparatus.

BACKGROUND

With continuous development of wireless technologies and continuous improvement of people's requirements, requirements for a communication rate and a delay are increasingly high. On one hand, a macro cell is required to better maintain mobility; on the other hand, a micro cell is required to support hotspot traffic, and a higher peak rate is provided through spectrum aggregation of more cells.

Currently, a long term evolution (LTE) technology introduces dual connectivity to support complex cell coverage and high-speed transmission requirements. As shown in FIG. 1, data on one data radio bearer (DRB) may be transmitted on connections to two base stations (for example, an MeNB and an SeNB in FIG. 1), and aggregates at a packet data convergence protocol (Packet Data Convergence Protocol layer, PDCP) layer of a main connection.

According to an existing data processing method, in each failure scenario of a secondary cell group (SCG), SCG failure information is sent to a network side, transmission of data on an SCG-related bearer is temporarily suspended, and related data is processed only when the network side resumes transmission of the data on the SCG-related bearer by using a reconfiguration message. There may be a relatively long delay from a time when an SCG failure is detected to a time when it is learned that the network side resumes the transmission of the data on the related bearer through reconfiguration. During the delay, data on a split DRB may be blocked all the time because when the SCG is suddenly abnormal, data usually cannot be successfully transmitted, data that is not successfully transmitted over an SCG leg has no opportunity to be processed, the data on the split DRB is missing, and consequently, subsequent data cannot be delivered upwards. This increases the delay, and causes rapidly increasing memory requirements.

SUMMARY

Embodiments of this application provide a data transmission method and an apparatus, to retransmit unacknowledged data in advance over an SCG leg in an SCG failure scenario, so that reordering duration on a receive side is reduced, and a service delay is improved.

To achieve the foregoing objective, the following technical solutions are used in the embodiments of this application.

According to a first aspect of the embodiments of this application, a data transmission method is provided. The data transmission method is applied to an apparatus. The apparatus is connected to a first base station over a first link, and is connected to a second base station over a second link. The method includes: transmitting, by the apparatus, a first data packet over the second link; and if determining that the second link fails, sending, by the apparatus, to-be-transmitted data packets to the first base station over the first link before the apparatus receives a reconfiguration message from the first base station, where the to-be-transmitted data packets include a data packet whose reception is not acknowledged as a success and that is in the first data packet, and the reconfiguration message is used to indicate a reconfigured link. Based on this solution, when the second link fails, the to-be-transmitted data packets can be retransmitted in advance before the apparatus receives the reconfiguration message from the first base station, to improve a service delay.

It may be understood that the to-be-transmitted data packets may alternatively include a data packet whose reception has been acknowledged by a receive side as a success and a data packet to be newly transmitted by a transmit side. This is not limited in this embodiment of this application. If the to-be-transmitted data packets include the data packet whose reception is not acknowledged by the receive side as a success and the data packet to be newly transmitted by the transmit side, and the second link fails, before the apparatus receives the reconfiguration message from the first base station, the apparatus may first transmit the data packet whose reception is not acknowledged as a success and that is in the to-be-transmitted data packets, and then transmit the data packet to be newly transmitted by the transmit side.

With reference to the first aspect, in a possible implementation, the first base station is configured to provide a service for a master cell group MCG, and the second base station is configured to provide a service for a secondary cell group SCG. Based on this solution, in a dual connectivity scenario, when it is determined that the second link fails, the to-be-transmitted data packets can be retransmitted in advance.

With reference to the first aspect and the foregoing possible implementation, in another possible implementation, a data volume of the to-be-transmitted data packets is less than, equal to, or greater than a specified threshold, where the specified threshold is used to indicate to transmit data over a preconfigured link when the data volume of the to-be-transmitted data packets is less than the first preset threshold, and the preconfigured link is the first link or the second link; and when the data volume of the to-be-transmitted data packets is greater than or equal to the specified threshold, data is transmitted over the first link and the second link. Based on this solution, regardless of the data volume of the to-be-transmitted data packets, as long as the second link fails, the apparatus can retransmit the to-be-transmitted data packets in advance, to improve the service delay.

With reference to the first aspect and the foregoing possible implementations, in another possible implementation, the if determining that the second link fails, sending, by the apparatus, to-be-transmitted data packets to the first base station over the first link before the apparatus receives a reconfiguration message from the first base station includes: if the apparatus determines that the second link fails, and a data volume of the to-be-transmitted data packets is greater than or equal to a first preset threshold, sending the to-be-transmitted data packets to the first base station over the first link before the apparatus receives the reconfiguration message from the first base station. Based on this solution, a retransmission threshold (the first preset threshold) is set, so that the to-be-transmitted data packets can be retransmitted in advance when the to-be-transmitted data packets are accumulated to be greater than or equal to the first preset threshold.

With reference to the first aspect and the foregoing possible implementations, in another possible implementation, the if determining that the second link fails, sending, by the apparatus, to-be-transmitted data packets to the first base station over the first link before the apparatus receives a reconfiguration message from the first base station includes: if determining that the second link fails, sending, by the apparatus, the to-be-transmitted data packets to the first base station over the first link based on first indication information before the apparatus receives the reconfiguration message from the first base station, where the first indication information is used to indicate the apparatus to autonomously transmit the to-be-transmitted data packets over the first link when the second link fails. Based on this solution, when the second link fails, retransmission can be performed in advance based on the first indication information specified in a protocol or the first indication information configured by a base station side.

With reference to the first aspect and the foregoing possible implementations, in another possible implementation, before the apparatus receives the reconfiguration message from the first base station, the method further includes: delivering, by the apparatus upwards inside the apparatus out of order, complete data packets received by the apparatus. Based on this solution, when the second link fails, the apparatus side can deliver, upwards inside the apparatus out of order, the data packets received by the apparatus, so that a condition of sliding a reordering window is met earlier, and data is delivered upwards earlier, thereby reducing stacked data.

With reference to the first aspect and the foregoing possible implementations, in another possible implementation, the apparatus includes a radio link control protocol layer RLC and a packet data convergence protocol layer PDCP, and the delivering, by the apparatus upwards inside the apparatus out of order, complete data packets received by the apparatus includes: delivering, by the RLC to the PDCP out of order, complete data packets received by the RLC; reordering, by the PDCP, the complete data packets received by the RLC; and if data packets in a reordering window of the PDCP are continuously received completely, sliding the reordering window of the PDCP, and delivering the data packets in the reordering window upwards, where the RLC layer is an RLC layer that communicates with the second base station over the second link. Based on this solution, when the second link fails, the RLC layer (an RLC layer that communicates with a secondary eNodeB over the second link) of the apparatus delivers, upwards, the complete data packets received by the RLC layer, so that the data packets can be reordered by the PDCP layer of the apparatus in advance, the PDCP of the apparatus can slide the window in advance, and the stacked data is reduced, to reduce memory usage of the receive side.

With reference to the first aspect and the foregoing possible implementations, in another possible implementation, the if determining that the second link fails, sending, by the apparatus, to-be-transmitted data packets to the first base station over the first link before the apparatus receives a reconfiguration message from the first base station includes: if determining that the second link fails, sending, by the apparatus, the to-be-transmitted data packets to the first base station over the first link before the apparatus sends a first message to the first base station, where the first message is used to indicate that the second link fails. Based on this solution, the to-be-transmitted data packets can be retransmitted before a message indicating that the second link fails is sent, and a retransmission time point is further advanced.

With reference to the first aspect and the foregoing possible implementations, in another possible implementation, the reconfiguration message indicates that the reconfigured link is a third link, the third link is a link between the apparatus and a third base station, and the method further includes: receiving, by the apparatus, the reconfiguration message from the first base station, and sending, to the third base station over the third link, a data packet that has not been sent and that is in the to-be-transmitted data packets, where the to-be-transmitted data packets further include a to-be-newly-transmitted data packet. Based on this solution, after the first base station reconfigures a link, the data packet that has not been sent and that is in the to-be-transmitted data packets can continue to be transmitted over the third link configured by the base station.

With reference to the first aspect and the foregoing possible implementations, in another possible implementation, the reconfiguration message indicates that the reconfigured link is the first link, and the method further includes: receiving, by the apparatus, the reconfiguration message from the first base station, and sending, to the first base station over the first link, a data packet that has not been sent and that is in the to-be-transmitted data packets, where the to-be-transmitted data packets further include a to-be-newly-transmitted data packet. Based on this solution, after the first base station reconfigures a link, the data packet that has not been sent and that is in the to-be-transmitted data packets can continue to be transmitted over the first link configured by the base station. With reference to the first aspect and the foregoing possible implementations, in another possible implementation, that the second link fails includes that a quantity of data packet retransmissions over the second link exceeds a preset maximum quantity of retransmissions, that a T313 timer for the second link expires, or that an uplink transmission time difference of the second link exceeds a preset maximum uplink transmission time difference. Based on this solution, it can be determined that the second link fails when the quantity of data packet retransmissions over the second link exceeds the preset maximum quantity of retransmissions, the T313 timer for the second link expires, or the uplink transmission time difference of the second link exceeds the preset maximum uplink transmission time difference.

According to a second aspect of the embodiments of this application, a data transmission method is provided, and is applied to a first base station. The first base station is connected to an apparatus over a first link, and a second base station is connected to the apparatus over a second link. The method includes: transmitting, by the first base station, a first data packet over the second link; and if determining that the second link fails, sending, by the first base station, to-be-transmitted data packets to the apparatus over the first link before a first moment, where the to-be-transmitted data packets include a data packet whose reception is not acknowledged as a success and that is in the first data packet, and the first moment is a moment at which the first base station receives a first message sent by the apparatus, the first moment is a moment at which the first base station sends a reconfiguration message to the apparatus, or the first moment is a moment at which the first base station receives a reconfiguration complete message sent by the apparatus, where the first message is used to indicate that the second link fails, the reconfiguration message is used to indicate a link reconfigured by the first base station, and the reconfiguration complete message is used to indicate that the apparatus has successfully received the reconfiguration message from the first base station. Based on this solution, when the first base station determines that the second link fails, a data packet whose reception is not acknowledged by the apparatus as a success and that is over the second link can be retransmitted in advance over the first link, to improve a service delay.

With reference to the second aspect, in a possible implementation, the determining that the second link fails includes: receiving, by the first base station, a second message sent by the second base station, and determining, based on the second message, that the second link fails, where the second message carries status information of the second link; or determining, by the second base station through detection, that the second link fails. Based on this solution, the first base station may determine, through detection, that the second link fails, or may determine, by receiving the message sent by the second base station, that the second link fails.

With reference to the second aspect and the foregoing possible implementation, in another possible implementation, the method further includes: receiving, by the first base station, the to-be-transmitted data packets sent by the apparatus, where the to-be-transmitted data packets are sent by the apparatus when the second link fails and before the apparatus receives the reconfiguration message from the first base station, and the to-be-transmitted data packets include a data packet whose reception is not acknowledged as a success and that is transmitted over the second link. Based on this solution, when the second link fails, the to-be-transmitted data packets retransmitted by the apparatus in advance can be received.

With reference to the second aspect and the foregoing possible implementations, in another possible implementation, the first base station includes a first protocol layer and a second protocol layer, the second base station includes a first protocol layer, and before the first base station receives the first message sent by the apparatus, the method further includes: if data transmitted over the first link and the second link is converged at the second protocol layer of the first base station, receiving, by the second protocol layer of the first base station, first data packets that are delivered by the first protocol layer of the second base station out of order, where the first data packets are complete data packets received by the first protocol layer of the second base station. Based on this solution, when the second link fails, an RLC layer of the second base station can deliver, out of order, complete data packets received by the RLC layer of the second base station, so that the data packets can be reordered by a PDCP layer of the first base station in advance, the PDCP of the first base station can slide a window in advance, and stacked data is reduced, to reduce memory usage of the apparatus.

With reference to the second aspect and the foregoing possible implementations, in another possible implementation, the method further includes: delivering, by the first protocol layer of the first base station to the second protocol layer of the first base station, second data packets received by the first protocol layer of the first base station, where the second data packets are complete data packets received by the first protocol layer of the first base station; and reordering, by the second protocol layer of the first base station, the first data packets and the second data packets, and if data packets in a reordering window of the second protocol layer of the first base station are continuously received completely, sliding the reordering window of the second protocol layer of the first base station, and delivering the data packets in the reordering window upwards, where the first protocol layer is a radio link control protocol layer RLC, and the second protocol layer is a packet data convergence protocol layer PDCP. Based on this solution, the PDCP layer of the first base station can receive the data packets delivered by the RLC of the second base station out of order, receive data packets delivered by an RLC layer of the first base station, and reorder and then deliver the data packets, to reduce the memory usage.

According to a third aspect of the embodiments of this application, a data transmission method is provided, and is applied to a second base station. The second base station is connected to an apparatus over a second link, and a first base station is connected to the apparatus over a first link; and the first base station includes a first protocol layer and a second protocol layer, and the second base station includes a first protocol layer and a second protocol layer. The method includes: if data transmitted over the first link and the second link is aggregated at the second protocol layer of the first base station, before the first base station reconfigures a link, delivering, by the first protocol layer of the second base station to the second protocol layer of the first base station out of order, first data packets received by the first protocol layer of the second base station, where the first data packets are complete data packets received by the first protocol layer of the second base station; or if the data transmitted over the first link and the second link is converged at the second protocol layer of the second base station, before the first base station reconfigures the link, delivering, by the first protocol layer of the second base station to the second protocol layer of the second base station out of order, the first data packets received by the first protocol layer of the second base station. Based on this solution, an RLC layer of the second base station can deliver, to a PDCP layer of the first base station or a PDCP layer of the second base station out of order, complete data packets received by the RLC layer of the second base station, thereby reducing data packet stacking, to reduce memory usage.

With reference to the third aspect, in a possible implementation, if the data transmitted over the first link and the second link is converged at the second protocol layer of the second base station, the method further includes: receiving, by the second protocol layer of the second base station, second data packets delivered by the first protocol layer of the first base station, where the second data packets are complete data packets received by the first protocol layer of the first base station; and reordering, by the second protocol layer of the second base station, the first data packets and the second data packets, and if data packets in a reordering window of the second protocol layer of the second base station are continuously received completely, sliding the reordering window of the second protocol layer of the second base station, and delivering data packets in the reordering window upwards, where the first protocol layer is a radio link control protocol layer RLC, and the second protocol layer is a packet data convergence protocol layer PDCP. Based on this solution, the PDCP layer of the second base station can receive the complete data packets delivered by the RLC layer of the second base station out of order, receive data packets delivered by an RLC layer of the first base station, and reorder and then deliver the data packets, so that the data packet stacking can be reduced, to reduce the memory usage.

According to a fourth aspect of the embodiments of this application, an apparatus is provided. The apparatus is connected to a first base station over a first link, and is connected to a second base station over a second link, and the apparatus includes a processing unit and a communications unit. The processing unit is configured to transmit a first data packet over the second link by using the communications unit; and the processing unit is further configured to determine whether the second link fails; and if determining that the second link fails, the processing unit sends to-be-transmitted data packets to the first base station over the first link by using the communications unit before the communications unit receives a reconfiguration message from the first base station, where the to-be-transmitted data packets include a data packet whose reception is not acknowledged as a success and that is in the first data packet, and the reconfiguration message is used to indicate a reconfigured link.

It should be noted that, in some embodiments, the apparatus may be an independent component, and the component may be a component in a terminal device. The processing unit may be a processor of the component, and the communications unit may be a communications interface of the component.

In some embodiments, the apparatus may alternatively be a chip, and the chip may be a chip running in a terminal device. The processing unit may be a processor of the chip, and the communications unit may be a communications interface of the chip, for example, a pin of the chip.

In some embodiments, the apparatus may alternatively be a terminal device. The processing unit may be a processor of the apparatus, and the communications unit may be a transceiver of the apparatus.

With reference to the fourth aspect, in a possible implementation, the first base station is configured to provide a service for a master cell group MCG, and the second base station is configured to provide a service for a secondary cell group SCG.

With reference to the fourth aspect and the foregoing possible implementation, in another possible implementation, a data volume of the to-be-transmitted data packets is less than, equal to, or greater than a specified threshold, where the specified threshold is used to indicate to transmit data over a preconfigured link when the data volume of the to-be-transmitted data packets is less than the first preset threshold, and the preconfigured link is the first link or the second link; and when the data volume of the to-be-transmitted data packets is greater than or equal to the specified threshold, data is transmitted over both the first link and the second link.

With reference to the fourth aspect and the foregoing possible implementations, in another possible implementation, the processing unit is specifically configured to: if the processing unit determines that the second link fails, and a data volume of the to-be-transmitted data packets is greater than or equal to a first preset threshold, send the to-be-transmitted data packets to the first base station over the first link by using the communications unit before the communications unit receives the reconfiguration message from the first base station.

With reference to the fourth aspect and the foregoing possible implementations, in another possible implementation, the processing unit is further specifically configured to: if determining that the second link fails, send, by the processing unit, the to-be-transmitted data packets to the first base station over the first link based on first indication information by using the communications unit before the communications unit receives the reconfiguration message from the first base station, where the first indication information is used to indicate the communications unit to autonomously transmit the to-be-transmitted data packets over the first link when the second link fails.

With reference to the fourth aspect and the foregoing possible implementations, in another possible implementation, the processing unit is further configured to deliver, upwards inside the apparatus out of order by using the communications unit, complete data packets received by the communications unit.

With reference to the fourth aspect and the foregoing possible implementations, in another possible implementation, the processing unit includes a first protocol module and a second protocol module, where the first protocol module is configured to deliver, to the second protocol module out of order, complete data packets received by the first protocol module; the second protocol module is configured to reorder the complete data packets received by the first protocol module; the second protocol module is further configured to: if data packets in a reordering window of the second protocol module are continuously received completely, slide the reordering window of the second protocol module, and deliver the data packets in the reordering window upwards; and the first protocol module is a first protocol module that transmits data over the second link.

With reference to the fourth aspect and the foregoing possible implementations, in another possible implementation, the processing unit is further configured to: if determining that the second link fails, send the to-be-transmitted data packets to the first base station over the first link by using the communications unit before the communications unit sends a first message to the first base station, where the first message is used to indicate that the second link fails.

With reference to the fourth aspect and the foregoing possible implementations, in another possible implementation, the reconfiguration message indicates that the reconfigured link is a third link, and the third link is a link between the apparatus and a third base station; and the processing unit is further configured to: receive, by using the communications unit, the reconfiguration message from the first base station; and send, to the third base station over the third link, a data packet that has not been sent and that is in the to-be-transmitted data packets, where the to-be-transmitted data packets further include a to-be-newly-transmitted data packet.

With reference to the fourth aspect and the foregoing possible implementations, in another possible implementation, the reconfiguration message indicates that the reconfigured link is the first link; and the processing unit is further configured to: receive, by using the communications unit, the reconfiguration message from the first base station; and send, to the first base station over the first link, a data packet that has not been sent and that is in the to-be-transmitted data packets, where the to-be-transmitted data packets further include a to-be-newly-transmitted data packet.

With reference to the fourth aspect and the foregoing possible implementations, in another possible implementation, that the second link fails includes that a quantity of data packet retransmissions over the second link exceeds a preset maximum quantity of retransmissions, that a T313 timer for the second link expires, or that an uplink transmission time difference of the second link exceeds a preset maximum uplink transmission time difference.

According to a fifth aspect of the embodiments of this application, a first base station is provided. The first base station is connected to an apparatus over a first link, and a second base station is connected to the apparatus over a second link. The first base station includes a processing unit and a communications unit. The processing unit is configured to transmit a first data packet over the second link by using the communications unit; and if determining that the second link fails, send to-be-transmitted data packets to the apparatus by using the communications unit over the first link before a first moment, where the to-be-transmitted data packets include a data packet whose reception is not acknowledged as a success and that is in the first data packet, and the first moment is a moment at which the first base station receives a first message sent by the apparatus, the first moment is a moment at which the first base station sends a reconfiguration message to the apparatus, or the first moment is a moment at which the first base station receives a reconfiguration complete message sent by the apparatus, where the first message is used to indicate that the second link fails, the reconfiguration message is used to indicate a link reconfigured by the first base station, and the reconfiguration complete message is used to indicate that the apparatus has successfully received the reconfiguration message from the first base station.

It should be noted that, in some embodiments, the first base station and the second base station may be two independent network devices, or may be integrated into one network device. The processing unit may be a processor of the first base station, and the communications unit may be a transceiver of the first base station.

With reference to the fifth aspect, in a possible implementation, the processing unit is further configured to receive, by using the communications unit, a second message sent by the second base station, and determine, based on the second message, that the second link fails, where the second message carries status information of the second link; or and the processing unit is further configured to determine, through detection, that the second link fails.

With reference to the fifth aspect and the foregoing possible implementation, in another possible implementation, the processing unit is further configured to receive, by using the communications unit, to-be-transmitted data packets sent by the apparatus, where the to-be-transmitted data packets are sent by the communications unit when the second link fails and before the apparatus receives the reconfiguration message sent by the communications unit, and the to-be-transmitted data packets include a data packet whose reception is not acknowledged as a success and that is transmitted over the second link.

With reference to the fifth aspect and the foregoing possible implementations, in another possible implementation, the communications unit includes a first protocol module and a second protocol module, and the second base station includes a first protocol module. The second protocol module of the first base station is configured to: if data transmitted over the first link and the second link is converged on the second protocol module of the first base station, before the first protocol module of the first base station receives the first message from the first base station, receive, by the second protocol module of the first base station, first data packets that are delivered by the first protocol module of the second base station out of order, where the first data packets are complete data packets received by the first protocol module of the second base station.

With reference to the fifth aspect and the foregoing possible implementations, in another possible implementation, the first protocol module of the first base station is configured to deliver second data packets received by the first protocol module of the first base station to the second protocol module of the first base station, where the second data packets are complete data packets received by the first protocol module of the first base station. The second protocol module of the first base station is further configured to reorder the first data packets and the second data packets. If data packets in a reordering window of the second protocol module of the first base station are continuously received completely, the reordering window of the second protocol module of the first base station is slid, and the data packets in the reordering window are delivered upwards. The first protocol module is a radio link control protocol RLC, and the second protocol module is a packet data convergence protocol PDCP.

According to a sixth aspect of the embodiments of this application, a second base station is provided. The second base station is connected to an apparatus over a second link, and a first base station is connected to the apparatus over a first link; and the first base station includes a first protocol module and a second protocol module, and the second base station includes a first protocol module and a second protocol module. The first protocol module of the second base station is configured to: if data transmitted over the first link and the second link is aggregated on the second protocol module of the first base station, before the first base station reconfigures a link, deliver, by the first protocol module of the second base station to the second protocol module of the first base station out of order, first data packets received by the first protocol module of the second base station, where the first data packets are complete data packets received by the first protocol module of the second base station. The first protocol module of the second base station is further configured to: if the data transmitted over the first link and the second link is converged on the second protocol module of the second base station, before the first base station reconfigures the link, deliver, by the first protocol module of the second base station to the second protocol module of the second base station out of order, the first data packets received by the first protocol module of the second base station.

It should be noted that, in some embodiments, the first base station and the second base station may be two independent network devices, or may be integrated into one network device. A processing unit may be a processor of the second base station, and a communications unit may be a transceiver of the second base station.

With reference to the sixth aspect, in a possible implementation, if the data transmitted over the first link and the second link is converged on the second protocol module of the second base station, the second protocol module of the second base station is configured to: if the data transmitted over the first link and the second link is converged on the second protocol module of the second base station, receive second data packets delivered by the first protocol module of the first base station, where the second data packets are complete data packets received by the first protocol module of the first base station. The second protocol module of the second base station reorders the first data packets and the second data packets. If data packets in a reordering window of the second protocol module of the second base station are continuously received completely, the reordering window of the second protocol module of the second base station is slid, and data packets in the reordering window are delivered upwards. The first protocol module is a radio link control protocol RLC, and the second protocol module is a packet data convergence protocol PDCP.

For descriptions of effects of the fourth aspect and the implementations of the fourth aspect, refer to descriptions of corresponding effects of the first aspect. For descriptions of effects of the fifth aspect and the implementations of the fifth aspect, refer to descriptions of corresponding effects of the second aspect. For descriptions of effects of the sixth aspect and the implementations of the sixth aspect, refer to descriptions of corresponding effects of the third aspect. Details are not described herein again.

According to a seventh aspect of the embodiments of this application, a computer storage medium is provided. The computer storage medium stores computer program code. When the computer program code is run on a processor, the processor is enabled to perform the data transmission method according to any one of the first aspect or the implementations of the first aspect, any one of the second aspect or the implementations of the second aspect, or any one of the third aspect or the implementations of the third aspect.

According to an eighth aspect of the embodiments of this application, a computer program product is provided. The program product stores computer software instructions executed by the foregoing processor. The computer software instructions include a program used to perform the solutions in the foregoing aspects.

According to a ninth aspect of the embodiments of this application, an apparatus is provided. The apparatus exists in a product form of a chip. A structure of the apparatus includes a processor and a memory. The memory is configured to be coupled to the processor, and stores program instructions and data that are necessary for the apparatus. The processor is configured to execute the program instructions stored in the memory, so that the apparatus performs a function of the apparatus in the foregoing methods.

DETAILED DESCRIPTION OF ILLUSTRATIVE EMBODIMENTS

To resolve a conventional-technology problem that when an SCG fails, a service delay is increased because related data is processed only when a network side resumes transmission of data on an SCG-related bearer by using a reconfiguration message, embodiments of this application provide a data transmission method, to retransmit, in advance in an SCG failure scenario, data whose reception is unacknowledged and that is over an SCG leg, so that reordering duration on a receive side is reduced, and the service delay is improved.

The data transmission method provided in the embodiments of this application is applied to an apparatus. The apparatus may be an apparatus, a chip, or a baseband chip that is disposed in a terminal UE. The apparatus may be connected to a plurality of cell sites. For example, the apparatus may be connected to a master eNodeB and at least one secondary eNodeB. When the apparatus is connected to one master eNodeB and one secondary eNodeB, the apparatus may receive data bearers from at least two serving cells of the two base stations.

Figure 1:
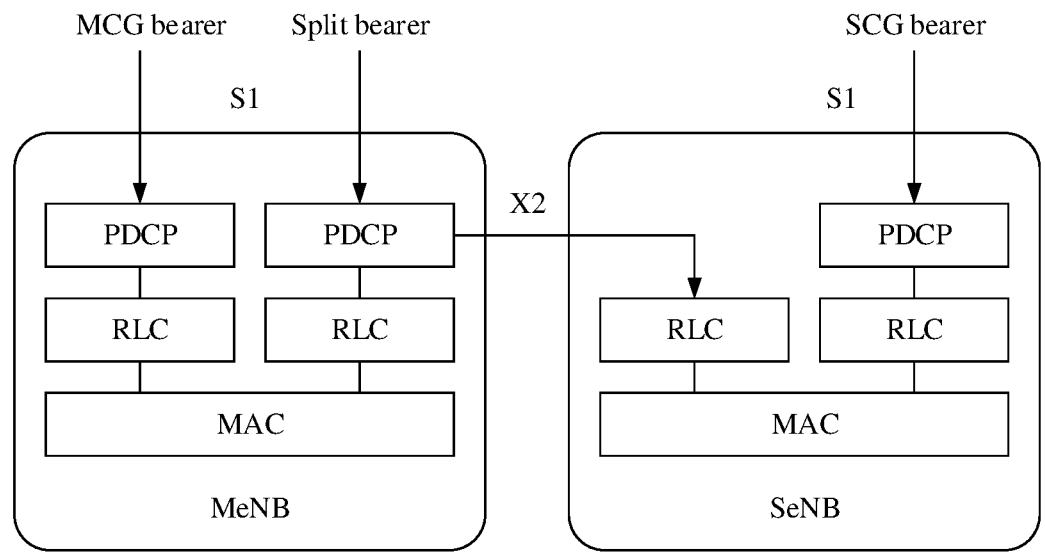
FIG. 1 is a schematic diagram of a dual connectivity architecture according to an embodiment of this application.

FIG. 1 shows an LTE dual-connectivity user plane architecture. In the LTE dual-connectivity mode, a data plane radio bearer may be independently served by a master eNodeB MeNB or a secondary eNodeB SeNB, or may be served by both an MeNB and an SeNB. The bearer is referred to as a master cell group (MCG) bearer when served only by the MeNB, where the MCG is a serving cell group controlled by the master eNodeB MeNB; the bearer is referred to as a secondary cell group (SCG) bearer when served only by the SeNB, where the SCG is a serving cell group controlled by the SeNB; the bearer is referred to as a split bearer when served by both the MeNB and the SeNB. According to the data transmission method in the embodiments of this application, data is transmitted in a split bearer mode. In the split bearer mode, an apparatus may transmit data over a first link and/or a second link. It should be noted that the master eNodeB MeNB and the secondary eNodeB SeNB in the embodiments of this application may be two independent network devices, or may be integrated into one network device.

Figure 2:
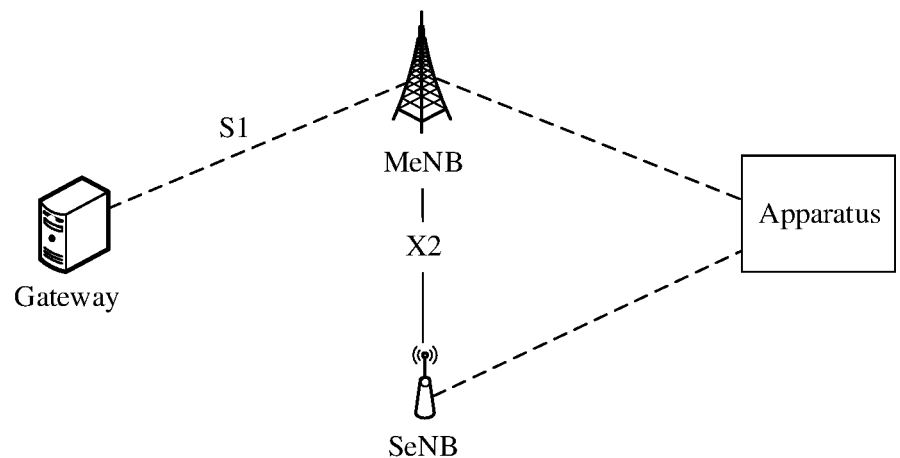
FIG. 2 is a schematic diagram of communication in a dual connectivity architecture according to an embodiment of this application.

As shown in FIG. 2, an MeNB may be connected to an evolved packet core (EPC) through an S1 interface. For example, the MeNB may be connected to a serving gateway (SGW) or a mobility management entity (MME) through the S1 interface. In FIG. 2, an example in which the MeNB is connected to the SGW through the S1 interface is used for description. The MeNB may include a packet data convergence protocol (PDCP) layer, a radio link control (RLC) layer, and a media access control (MAC) layer. The MeNB may receive data and/or control information from the gateway at the PDCP layer. For example, the data or the control information may be transmitted from the PDCP layer in the MeNB to the RLC layer and the MAC layer in the MeNB, and the data or the control information may be transmitted from the PDCP layer in the MeNB to an RLC layer in an SeNB through an X2 interface.

For example, an apparatus in the following embodiments of this application may work in a dual-connectivity mode, and is connected to a first base station over a first link, and is connected to a second base station over a second link. The first base station may be the master eNodeB MeNB in FIG. 1, and the second base station may be a secondary eNodeB SeNB in FIG. 1. The first link between the apparatus and the MeNB may be denoted as an MCG leg, and the second link between the apparatus and the SeNB may be denoted as an SCG leg.

Figure 3:
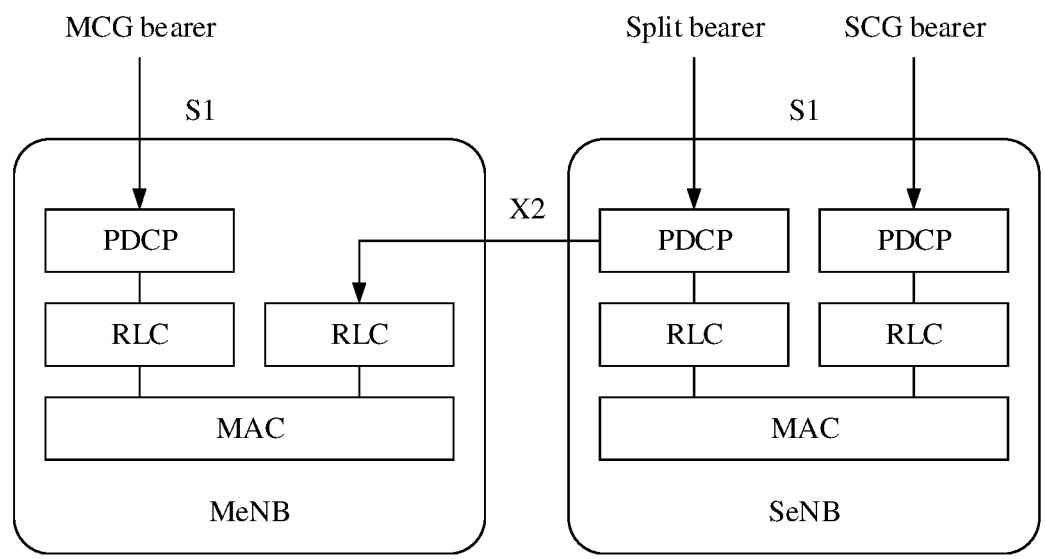
FIG. 3 is a schematic diagram of another dual connectivity architecture according to an embodiment of this application.

For example, as shown in FIG. 1, in a long term evolution (LTE) dual-connectivity scenario, data on a radio bearer (DRB) may be transmitted over both the first link and the second link, and converged at a PDCP layer of the MCG. As shown in FIG. 3, in a 5G dual-connectivity scenario, data on a DRB may also be transmitted over both a first link and a second link, and converged at a PDCP layer of an SCG. This is not limited in the embodiments of this application.

Figure 4:
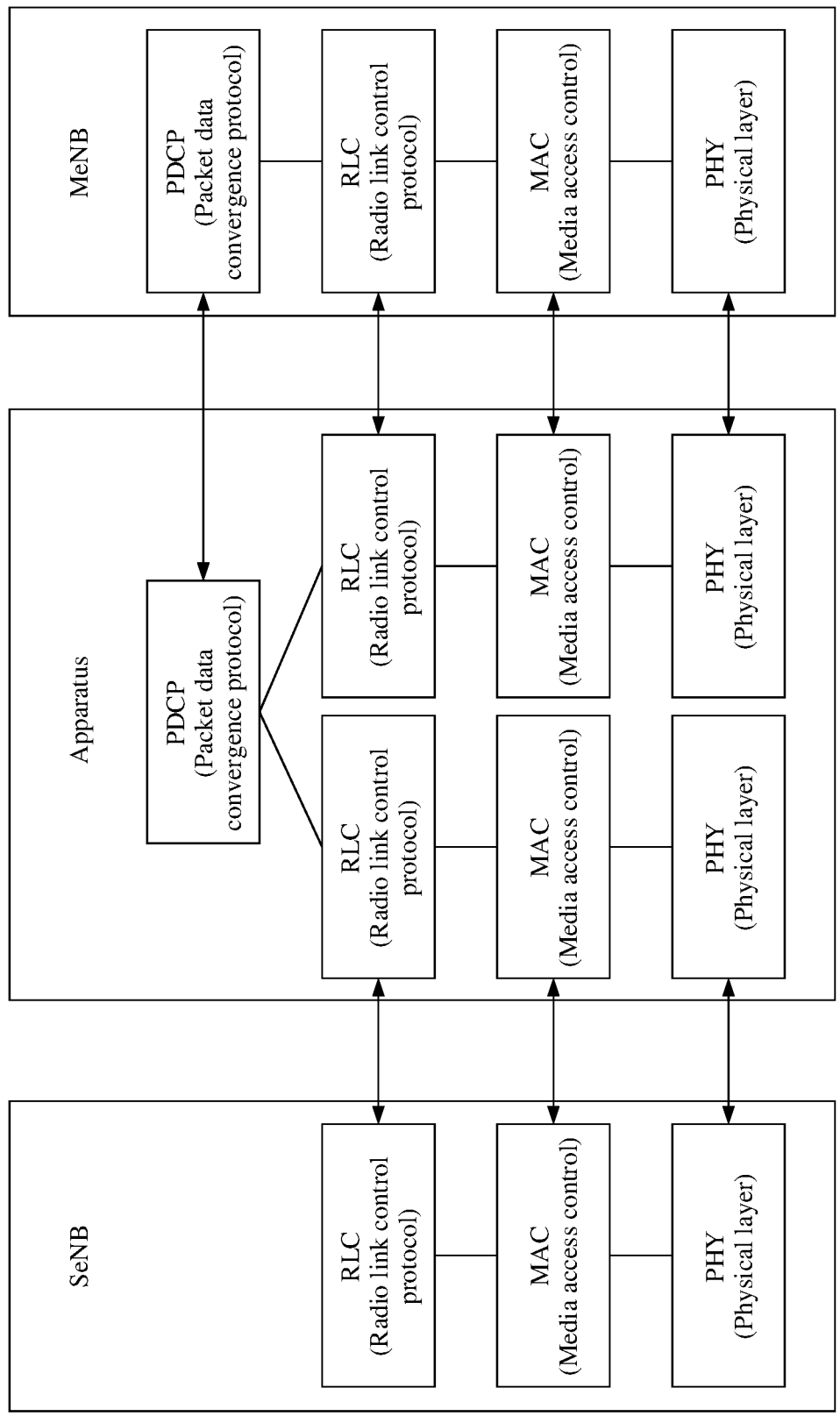
FIG. 4 is a schematic diagram of a user plane protocol stack in a dual connectivity mode according to an embodiment of this application.

FIG. 4 is a schematic diagram of a user plane protocol stack in a dual connectivity mode according to an embodiment of this application. As shown in FIG. 4, in a data transmission process, data may be transmitted between an apparatus, a master eNodeB MeNB, and a secondary eNodeB SeNB through PDCP layers, RLC layers, MAC layers, and physical layers. Each layer is used to complete different data processing. The PDCP mainly performs security operations and header compression/decompression processing, for example, encryption and integrity protection, and robust header compression/robust header compression (Robust Header Compression, ROHC) compression and decompression. The RLC mainly completes data segmentation and concatenation, in-order delivery, out-of-order delivery, and automatic repeat request (Automatic Repeat reQuest, ARQ) data transmission assurance. The MAC mainly completes scheduling, concatenation processing of different logical channels, and a hybrid automatic repeat request (Hybrid Automatic Repeat Request, HARQ) operation. The physical layer completes transport block packeting and sending performed over an air interface.

It should be noted that, because the apparatus in this embodiment of this application may establish connections to the two base stations: the master eNodeB and the secondary eNodeB, the apparatus may include two RLC layers. One RLC layer communicates with the master eNodeB MeNB over a first link, and the other RLC layer communicates with the secondary eNodeB SeNB over a second link.

It may be understood that, in FIG. 4, only that data transmitted over the first link and the second link is aggregated at a PDCP layer of the master eNodeB MeNB is used as an example for description. During actual application, the data transmitted over the first link and the second link may alternatively be aggregated at a PDCP layer of the secondary eNodeB SeNB. This is not limited in this embodiment of this application.

Figure 5:
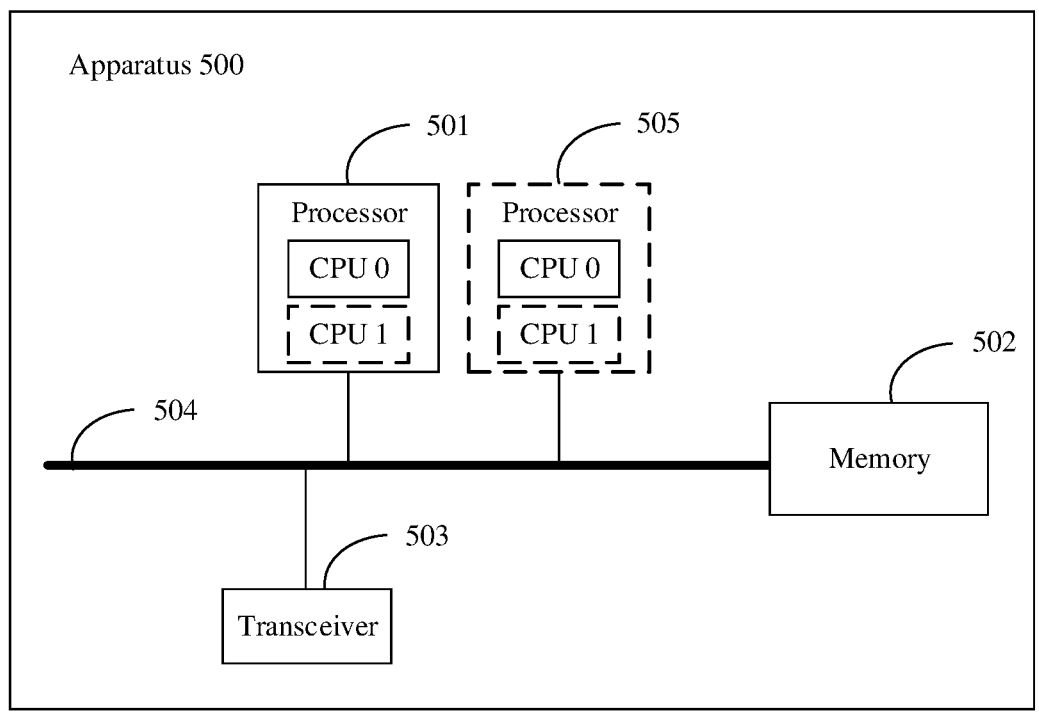
FIG. 5 is a structural block diagram of an apparatus according to an embodiment of this application.

The data transmission method provided in the embodiments of the present invention may be applied to an apparatus 500 shown in FIG. 5. The apparatus 500 may be a chip, an apparatus disposed in a terminal, or a terminal device. As shown in FIG. 5, the apparatus 500 may include at least one processor 501, a memory 502, a transceiver 503, and a communications bus 504.

The following specifically describes the components of the apparatus with reference to FIG. 5.

The processor 501 is a control center of the apparatus, and may be one processor or may be a collective term of a plurality of processing elements. For example, the processor 501 is a central processing unit (CPU), or may be an application specific integrated circuit (ASIC), or may be configured as one or more integrated circuits implementing the embodiments of the present invention, for example, one or more microprocessors (DSP) or one or more field programmable gate arrays (FPGA).

The processor 501 may execute various functions of a communications device by running or executing a software program stored in the memory 502 and invoking data stored in the memory 502.

During specific implementation, in an embodiment, the processor 501 may include one or more CPUs, for example, a CPU 0 and a CPU 1 shown in FIG. 5.

During specific implementation, in an embodiment, the apparatus may include a plurality of processors such as the processor 501 and a processor 505 shown in FIG. 5. Each of the processors may be a single-core processor (single-CPU) or may be a multi-core processor (multi-CPU). The processor herein may be one or more communications devices, circuits, and/or processing cores configured to process data (for example, a computer program instruction).

The memory 502 may be a read-only memory (ROM) or another type of static storage communications device that can store static information and instructions, or a random access memory (RAM) or another type of dynamic storage communications device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage communications device, or any other medium that can be used to carry or store expected program code in a form of an instruction or a data structure and that can be accessed by a computer, but is not limited thereto. The memory 502 may exist independently, and is connected to the processor 501 by using the communications bus 504. Alternatively, the memory 502 and the processor 501 may be integrated together.

The memory 502 is configured to store the software program for executing the solutions in the present invention, and the execution is controlled by the processor 501.

The transceiver 503 is configured to communicate with a second device. Certainly, the transceiver 503 may further be configured to communicate with a communications network, such as the Ethernet, a radio access network (RAN), or a wireless local area network (WLAN). The transceiver 503 may include a receiving unit for implementing a receiving function and a sending unit for implementing a sending function.

The communications bus 504 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 5, but this does not mean that there is only one bus or only one type of bus.

A structure of the communications device shown in FIG. 5 does not constitute a limitation on the communications device. The communications device may include components more or fewer than those shown in the figure, may combine some components, or may have different component arrangements.

Figure 6:
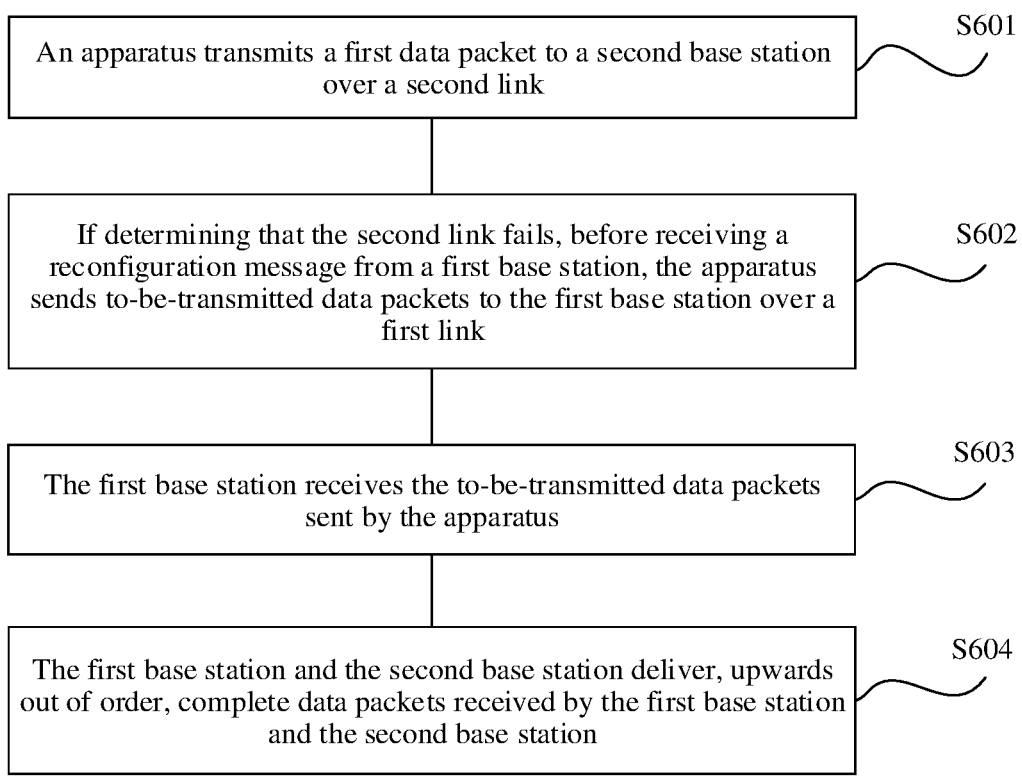
FIG. 6 is a flowchart of a data transmission method according to an embodiment of this application.

With reference to FIG. 1 to FIG. 5, as shown in FIG. 6, an embodiment of this application provides a data transmission method. The method may include steps S601 to S604.

S601. An apparatus transmits a first data packet to a second base station over a second link.

For example, during uplink transmission, the apparatus may transmit the first data packet over the second link. Step S601 may include: The apparatus transmits the first data packet only over the second link, or the apparatus transmits another data packet over a first link while transmitting the first data packet over the second link. This is not limited in this embodiment of this application.

For example, that the apparatus transmits the first data packet over the second link may include: transmitting, by a PDCP layer of the apparatus, the first data packet to an SCG RLC layer of the second base station over an SCG leg.

S602. If determining that the second link fails, before receiving a reconfiguration message sent by a first base station, the apparatus sends to-be-transmitted data packets to the first base station over the first link.

The to-be-transmitted data packets include a data packet whose reception is not acknowledged as a success and that is in the first data packet. It may be understood that the to-be-transmitted data packets include a data packet whose reception is not acknowledged by a receive side as a success and that is transmitted over the second link. For example, the to-be-transmitted data packets may include a data packet that is not successfully transmitted over the second link, or may include a data packet that is successfully transmitted over the second link but the apparatus does not receive a message that is sent by the receive side and that is used to acknowledge successful reception of the data packet. The to-be-transmitted data packets may further include a data packet to be newly transmitted by the apparatus side. This is not limited in this embodiment of this application.

It may be understood that the to-be-transmitted data packets may alternatively include a data packet whose reception has been acknowledged by the receive side as a success, or may further include the data packet to be newly transmitted by the apparatus. This is not limited in this embodiment of this application. For example, if the to-be-transmitted data packets include a data packet whose reception is not acknowledged by the receive side as a success and a data packet to be newly transmitted by a transmit side, step S602 may include: Before receiving the reconfiguration message from the first base station, the apparatus may first transmit the data packet whose reception is not acknowledged as a success and that is in the to-be-transmitted data packets, and then transmit the data packet to be newly transmitted by the transmit side. A specific transmission sequence of the to-be-transmitted data packets is not limited in this embodiment of this application, and is merely an example for description herein.

For example, that the second link fails may be denoted as an SCG failure. A case of the SCG failure may include a case in which a quantity of data packet retransmissions over the second link exceeds a preset maximum quantity of retransmissions, a case in which a T313 timer for the second link expires, a case in which an uplink transmission time difference of the second link exceeds a preset maximum uplink transmission time difference, or the like. This is not limited in this embodiment of this application. For example, the T313 timer may be a T313 timer in the 36.331 protocol. It may be understood that, if UE, in a synchronized state, continuously detects that an N313 side is out of synchronization, the UE starts the T313 timer. In the T313 timer, if the UE continuously detects that an N315 side is in synchronization, the UE enters the synchronized state. Otherwise, when T313 expires, the UE initiates cell update that is because of a radio link failure.

For example, if a scenario in which the second link fails is that the quantity of data packet retransmissions over the second link exceeds the preset maximum quantity of retransmissions, the determining that the second link fails may be: An RLC layer of the apparatus detects that the quantity of data packet retransmissions over the second link exceeds the preset maximum quantity of retransmissions, and therefore determines that the second link fails, and generates an SCG failure message indicating that the second link fails. If a scenario in which the second link fails is that the T313 timer for the second link expires, the determining that the second link fails may include: An RRC layer or a physical layer of the apparatus detects that the T313 timer expires, and therefore determines that the second link fails, and generates an SCG failure message indicating that the second link fails. If a scenario in which the second link fails is that the uplink transmission time difference of the second link exceeds the preset maximum uplink transmission time difference, the determining that the second link fails may include: A MAC layer of the apparatus detects that the uplink transmission time difference of the second link exceeds the preset maximum uplink transmission time difference, and therefore determines that the second link fails, and generates an SCG failure message indicating that the second link fails. Determining of scenarios in which the second link fails is not limited in this embodiment of this application, and merely examples for description are provided herein.

For example, the reconfiguration message is used to indicate a reconfigured link. The reconfigured link may be a link that is reconfigured by the first base station for the second link after receiving the SCG failure message that indicates that the second link fails and that is sent by the apparatus. The reconfigured link may be the first link, or may be a newly configured third link. The third link may be a link between the foregoing apparatus and a third base station. A specific link that is newly configured by the first base station is not limited in this embodiment of this application.

It may be understood that, in the technical solution in this embodiment of this application, after it is determined that an SCG failure occurs on the second link, before the first base station reconfigures the second link, a data packet (a to-be-transmitted data packet) whose reception is not acknowledged by the receive side as a success and that is over the second link SCG leg may be immediately retransmitted in advance over the first link MCG leg, so that the to-be-transmitted data packet can be transmitted without waiting until the first base station reconfigures a link, to effectively reduce a service delay.

In an implementation, after determining that the second link fails, the RLC layer of the apparatus may directly transmit a first message to the PDCP layer. Therefore, before the apparatus receives the reconfiguration message from the first base station, the PDCP layer determines, based on the first message, to send the to-be-transmitted data packets to the first base station over the first link. The first message is used to indicate that the second link fails.

In another implementation, after determining that the second link fails, the RLC layer of the apparatus generates the SCG failure message indicating that the second link fails, and transmits the SCG failure message to the RRC layer. After receiving the SCG failure message, the RRC layer transmits, to the PDCP layer, a first message indicating that the second link fails. Therefore, before the apparatus receives the reconfiguration message from the first base station, the PDCP layer sends the to-be-transmitted data packets to the first base station over the first link based on the first message.

In still another implementation, after determining that the second link fails, the RRC layer of the apparatus directly transmits, to the PDCP layer, a first message indicating that the second link fails. Therefore, before the apparatus receives the reconfiguration message from the first base station, the PDCP layer sends the to-be-transmitted data packets to the first base station over the first link.

In still another implementation, after determining that the second link fails, the RRC layer of the apparatus generates the SCG failure message indicating that the second link fails, and transmits the SCG failure message to the RLC layer. After receiving the SCG failure message, the RLC layer transmits, to the PDCP layer, a first message indicating that the second link fails. Therefore, before the apparatus receives the reconfiguration message from the first base station, the PDCP layer sends the to-be-transmitted data packets to the first base station over the first link.

In still another implementation, after determining that the second link fails, the MAC layer of the apparatus directly transmits, to the PDCP layer, a first message indicating that the second link fails. Therefore, before the apparatus receives the reconfiguration message from the first base station, the PDCP layer sends the to-be-transmitted data packets to the first base station over the first link.

In still another implementation, after determining that the second link fails, the MAC layer of the apparatus generates the SCG failure message indicating that the second link fails, and transmits the SCG failure message to the RRC layer. After receiving the SCG failure message, the RRC layer transmits, to the PDCP layer, a first message indicating that the second link fails. Therefore, before the apparatus receives the reconfiguration message from the first base station, the PDCP layer sends the to-be-transmitted data packets to the first base station over the first link.

It may be understood that, after determining that the second link fails or receiving the SCG failure message, the RLC layer may further send, to the PDCP layer, related information of a data packet whose reception is not acknowledged by a base station side as a success, or send, to the PDCP layer, related information of a data packet whose reception has been acknowledged by a base station side as a success, so that the PDCP layer determines, based on the foregoing information, the data packet whose reception is not acknowledged by the base station side as a success, and retransmits the data packet in advance.

It should be noted that an implementation of step S602 may include the following three cases.

For example, in a first case, if the apparatus determines that the second link fails, and a data volume of the to-be-transmitted data packets is greater than or equal to a second preset threshold, before receiving the reconfiguration message from the first base station, the apparatus sends the to-be-transmitted data packets to the first base station over the first link.

It may be understood that the second preset threshold is a preset retransmission threshold. The to-be-transmitted data packets are retransmitted over the first link only when the data volume of the to-be-transmitted data packets meets the preset retransmission threshold. The to-be-transmitted data packets may include the data packet whose reception is not acknowledged by the receive side as a success and that is transmitted over the second link and the to-be-newly-transmitted data packet.

For example, the second preset threshold may be set to 0 or any value greater than 0. When the second preset threshold is set to 0, after the SCG failure is determined, provided that there is a data packet whose reception is not acknowledged by the receive side as a success and that is over the second link, the to-be-transmitted data packets may be immediately retransmitted over the first link. When the second preset threshold is set to any value greater than 0, the PDCP layer of the apparatus further determines whether the data volume of the to-be-transmitted data packets exceeds the second preset threshold. If the data volume of the to-be-transmitted data packets exceeds the second preset threshold, a requirement for immediate retransmission over the first link is met. The PDCP layer of the apparatus sends the to-be-transmitted data packets to the first base station over the first link. A specific value of the second preset threshold is not limited in this embodiment of this application, and may be specifically configured based on actual application.

For example, in a second case, if determining that the second link fails, before receiving the reconfiguration message from the first base station, the apparatus may send the to-be-transmitted data packets to the first base station over the first link based on first indication information.

It may be understood that the first indication information may be indication information specified in a protocol, or may be indication information preconfigured by the first base station. The indication information is used to indicate the apparatus to autonomously transmit the to-be-transmitted data packets over the first link when the second link fails.

A case in which if determining that the second link fails, before receiving the reconfiguration message from the first base station, the apparatus triggers retransmission of the to-be-transmitted data packets over the first link may be: When the second link fails, the to-be-transmitted data packets are immediately retransmitted over the first link based on the first indication information; or when the second link fails and the accumulated data volume of the to-be-transmitted data packets exceeds the second preset threshold, the to-be-transmitted data packets are retransmitted over the first link. This is not limited in this embodiment of this application.

For example, in a third case, if determining that the second link fails, before sending a second message to the first base station, the apparatus sends the to-be-transmitted data packets to the first base station over the first link. The second message is used to indicate that the second link fails.

It may be understood that, after determining that the second link fails, the apparatus sends, to the first base station, the second message indicating that the second link fails. Therefore, the first base station reconfigures the second link. In this embodiment of this application, when determining that the second link fails, before sending the SCG failure message indicating that the second link fails to the first base station, the apparatus may send the to-be-transmitted data packets to the first base station over the first link, to further implement in-advance retransmission of the to-be-transmitted data packets.

It may be understood that, in a data transmission method in a conventional technology, after the SCG failure occurs, transmission of data on an SCG-related bearer is temporarily suspended, and related data is processed only when a network side resumes transmission of the data on the SCG-related bearer by using the reconfiguration message. Consequently, there is a relatively long delay from a time when the SCG failure is detected to a time when it is learned that the network side resumes the transmission of the data on the related bearer through reconfiguration. However, in the technical solution in this embodiment of this application, in-advance retransmission may be immediately performed, without waiting for reconfiguration of the network side, over the first link after the SCG failure occurs. Compared with the solution in the conventional technology, the service delay is improved.

S603. The first base station receives the to-be-transmitted data packets sent by the apparatus.

The to-be-transmitted data packets are sent by the apparatus when the second link fails and before the apparatus receives the reconfiguration message from the first base station.

S604. The first base station and the second base station deliver, upwards out of order, complete data packets received by the first base station and the second base station.

For example, if data transmitted over the first link and the second link is converged at a PDCP layer of the first base station, the first base station delivers, upwards inside the first base station out of order, complete data packets received by the first base station. If data transmitted over the first link and the second link is converged at a PDCP layer of the second base station, the second base station delivers, upwards inside the second base station out of order, complete data packets received by the second base station.

In an implementation, if the data transmitted over the first link and the second link is converged at the PDCP layer of the first base station, step S604 specifically includes steps S6041a to S6041d.

S6041a. An RLC layer of the first base station delivers, to the PDCP layer of the first base station, second data packets received by the RLC layer of the first base station.

The second data packets are complete data packets received by the PDCP layer of the first base station.

For example, the RLC layer of the first base station may deliver, to the PDCP layer of the first base station in order or out of order, the second data packets received by the RLC layer of the first base station. This is not limited in this embodiment of this application.

It may be understood that, the complete data packets received by the RLC layer of the first base station may include a complete data packet in data packets received by the RLC layer of the first base station before the second link fails, that is, the SCG failure occurs, and a complete data packet in the to-be-transmitted data packets retransmitted over the first link when the second link fails, that is, the SCG failure occurs.

S6041b. An RLC layer of the second base station delivers third data packets to the PDCP layer of the first base station out of order.

The third data packets are complete data packets received by the RLC layer of the second base station.

For example, before the first base station receives a message that is sent by the apparatus and that indicates that the second link fails, or before the first base station reconfigures the link, the RLC layer of the second base station may deliver, to the PDCP layer of the first base station out of order, the complete data packets received by the RLC layer of the second base station.

It should be noted that, compared with the conventional technology in which an RLC layer needs to deliver data packets upwards in order, in this embodiment of this application, because the RLC layer of the second base station may receive only some data packets when the second link fails, the data packets cannot be delivered upwards based on the conventional technology. Instead, by using the transmission method in this embodiment of this application, when the second link fails, the RLC of the second base station can deliver, to the PDCP layer of the first base station out of order, the complete data packets received by the RLC of the second base station, so that the data packets can be reordered by the PDCP layer of the first base station in advance, the PDCP of the first base station can slide a window in advance, and stacked data is reduced, to reduce memory usage of the receive side.

It may be understood that the complete data packets received by the RLC layer of the second base station may include a complete data packet in data packets received by the RLC layer of the second base station before the second link fails, that is, the SCG failure occurs.

S6041c. The PDCP layer of the first base station receives the third data packets delivered by the RLC layer of the second base station out of order.

S6041d. The PDCP layer of the first base station reorders the second data packets and the third data packets, and if data packets in a reordering window of the PDCP layer of the first base station are continuously received completely, the reordering window of the PDCP layer of the first base station is slid, and the data packets in the reordering window are delivered upwards.

For example, in step S6041d, the PDCP layer of the first base station may reorder the second data packets and the third data packets that are delivered out of order, and when the data packets in the reordering window of the PDCP layer of the first base station is continuously received completely, slide the reordering window of the PDCP layer, and deliver data in the reordering window to an application layer.

In another implementation, if the data transmitted over the first link and the second link is converged at the PDCP layer of the second base station, step S604 specifically includes steps S6042a to S6042d.

S6042a. An RLC layer of the first base station delivers, to the PDCP layer of the second base station, second data packet received by the RLC layer of the first base station.

For example, the RLC layer of the first base station may deliver, to the PDCP layer of the second base station in order or out of order, the second data packets received by the RLC layer of the first base station. This is not limited in this embodiment of this application.

S6042b. The PDCP layer of the second base station receives the second data packets delivered by the RLC layer of the first base station.

For example, the PDCP layer of the second base station receives second data packets delivered by an MCG RLC out of order.

S6042c. An RLC layer of the second base station delivers, to the PDCP layer of the second base station out of order, third data packet received by the RLC layer of the second base station.

It may be understood that the RLC layer of the second base station may deliver, to the PDCP layer of the second base station out of order before the first base station reconfigures the link, complete data packets received by the RLC layer of the second base station.

It should be noted that, compared with the conventional technology in which an RLC layer needs to deliver data packets upwards in order, in this embodiment of this application, because the RLC layer of the second base station may receive only some data packets, the data packets cannot be delivered upwards based on the conventional technology. Instead, by using the transmission method in this embodiment of this application, when the second link fails, the RLC of the second base station can deliver, to the PDCP layer of the second base station out of order, the complete data packets received by the RLC of the second base station, so that the data packets can be reordered by the PDCP layer of the second base station in advance, the PDCP of the second base station can slide a window in advance, and stacked data is reduced, to reduce memory usage of the receive side.

S6042d. The PDCP layer of the second base station reorders the second data packets and the third data packets, and if data packets in a reordering window of the PDCP layer of the second base station are continuously received completely, the reordering window of the PDCP layer of the second base station is slid, and the data packets in the reordering window are delivered upwards.

For example, the PDCP layer of the second base station reorders the second data packets and the third data packets, and when the reordering window of the PDCP layer of the second base station is continuously received completely, slides the reordering window of the PDCP layer, and may deliver data in the reordering window to an application layer.

It should be noted that, in this embodiment of this application, when the second link fails, received data packets are reassembled in real time, the complete data packets received by the first base station are delivered upwards in order or out of order, and the complete data packets received by the RLC layer of the second base station are reported to the PDCP layer out of order, so that after the RLC of the second base station receives the complete data packets, the data packets can be reordered by the PDCP in advance, and data can be delivered upwards more quickly, thereby reducing stacked data and reducing memory usage on the receive side. Although the data delivered upwards in this period is out of order, data finally delivered by the PDCP layer upwards is still in order because the PDCP layer performs reordering.

It should be noted that, as stipulated in an existing protocol, a volume of to-be-transmitted data on the apparatus side may be less than, equal to, or greater than a first preset threshold, where the first preset threshold is used to indicate to transmit data over a preconfigured link when the data volume of the to-be-transmitted data packets is less than the first preset threshold, and the preconfigured link is the first link or the second link; and when the data volume of the to-be-transmitted data packets is greater than or equal to the first preset threshold, data is transmitted over the first link and the second link. For example, the first preset threshold may be a threshold specified in the protocol 36.331. This is not limited in this embodiment of this application.

It may be understood that the data transmission method shown in FIG. 6 is not only applicable to the scenario specified in the foregoing protocol, but also applicable to a plurality of other application scenarios. The following describes in detail application scenarios to which the data transmission method shown in FIG. 6 is applicable.

In a first application scenario, the first preset threshold is preconfigured, and the preconfigured link is the first link or the second link. If the data volume of the to-be-transmitted data packets is greater than the first preset threshold, the PDCP layer of the apparatus transmits data over both the first link and the second link. If it is determined that the second link fails (SCG failure), before the apparatus receives the reconfiguration message from the first base station, the PDCP layer of the apparatus immediately retransmits the to-be-transmitted data packets in advance over the first link. Compared with the protocol in which when the SCG failure occurs, data is retransmitted after the first base station reconfigures the link, a retransmission time point is advanced.

In a second application scenario, the first preset threshold is preconfigured, and the preconfigured link is the second link. If the data volume of the to-be-transmitted data packets is less than the first preset threshold, the PDCP layer of the apparatus transmits the data packets to the second base station over the second link. If it is determined that the second link fails (SCG failure), before the apparatus receives the reconfiguration message from the first base station, the PDCP layer of the apparatus immediately retransmits the to-be-transmitted data packets in advance over the first link.

It may be understood that, in this scenario, data is transmitted only over the second link based on the preconfigured link, and no data is transmitted over the first link (because a threshold trigger condition of transmission over the first link is not met in this case). In this case, when the SCG failure occurs, immediately triggering retransmission over the first link violates preconfiguration. However, because in the preconfiguration, data may be transmitted over the first link when the data volume is greater than the first preset threshold, and it indicates that the first link may be used to transmit data, according to the solution in this embodiment of this application, if the SCG failure occurs in this scenario, the PDCP layer of the apparatus still retransmits the to-be-transmitted data packets in advance over the first link.

In a third application scenario, the first preset threshold is preconfigured, and the preconfigured link is the first link. If the data volume of the to-be-transmitted data packets is less than the first preset threshold, the PDCP layer of the apparatus transmits the data packets to the first base station over the first link. If it is determined that the second link fails (SCG failure), before the apparatus receives the reconfiguration message from the first base station, the PDCP layer of the apparatus immediately retransmits the to-be-transmitted data packets in advance over the first link.

It should be noted that, in this scenario, although data is transmitted over the first link MCG leg, when a volume of to-be-transmitted data on the apparatus side at a previous moment exceeds the first threshold, data may also be transmitted over the second link SCG leg. Therefore, the SCG failure may also occur in this scenario. If it is determined that the second link fails (SCG failure), the to-be-transmitted data packets may include the data packet whose reception is not acknowledged by the receive side as a success and that is over the SCG leg. Therefore, after the SCG failure is determined, in-advance retransmission, over the first link, of the data packet that is not successfully acknowledged by the receive side and that is over the SCG leg is immediately triggered.

In a fourth application scenario, the network side does not configure the first preset threshold, and the PDCP layer of the apparatus may transmit data over the first link and/or the second link. In this scenario, if determining that the second link fails (SCG failure), before receiving the reconfiguration message from the first base station, the apparatus immediately triggers in-advance retransmission, over the first link, of the data packet that is not successfully acknowledged by the receive side and that is over the SCG leg.

It may be understood that the data transmission method shown in FIG. 6 is applicable to the foregoing plurality of different application scenarios. A specific scenario to which the method shown in FIG. 6 is applicable is not limited in this embodiment of this application. This is merely an example for description. According to the data transmission method shown in FIG. 6, when the SCG failure occurs, the apparatus side can immediately trigger retransmission, thereby improving the service delay.

According to the data transmission method provided in this embodiment of this application, the first data packet is transmitted over the second link. If determining that the second link fails, before receiving the reconfiguration message from the first base station, the apparatus sends the to-be-transmitted data packets to the first base station over the first link. The to-be-transmitted data packets include the data packet whose reception is not acknowledged as a success and that is in the first data packet. The first base station receives the to-be-transmitted data packets sent by the foregoing apparatus. The first base station and the second base station deliver, upwards out of order, the complete data packets received by the first base station and the second base station. According to the technical solution in this embodiment of this application, when the second link fails, the data packet whose reception is not acknowledged by the receive side as a success and that is over the second link can be retransmitted in advance over the first link. Compared with the conventional technology in which retransmission needs to be performed after the network side completes reconfiguration, this can improve the service delay, and improve data transmission efficiency. In addition, the first base station and the second base station can directly deliver, upwards out of order without waiting for a reordering result, the complete data packets received by the first base station and the second base station, so that data stacked on the receive side is reduced, and memory usage on the receive side is reduced.

Figure 7:
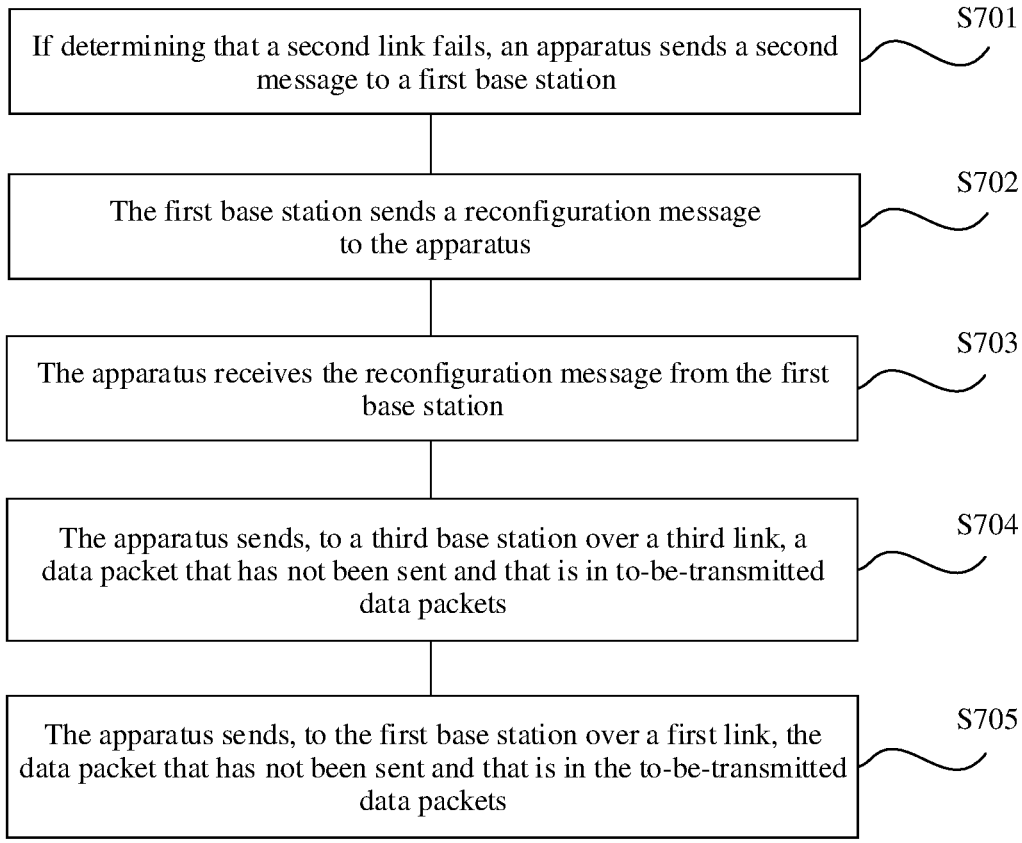
FIG. 7 is a flowchart of another data transmission method according to an embodiment of this application.

This application provides another embodiment. As shown in FIG. 7, if the reconfiguration message indicates that the reconfigured link is the third link, and the third link is the link between the foregoing apparatus and the third base station, the foregoing data transmission method further includes steps S701 to S705.

S701. If determining that the second link fails, the apparatus sends the second message to the first base station.

For example, after determining that the second link fails, the apparatus side may send the second message to the first base station, where the second message is used to indicate that the second link fails.

It may be understood that step S701 may occur before step S602, or may occur after step S602, or step S701 and step S602 may occur simultaneously. If step S701 occurs before step S602, after determining that the second link fails, the apparatus side first sends, to the first base station, the second message indicating that the second link fails, and before the first base station reconfigures the link, retransmits the to-be-transmitted data packets in advance over the first link. If step S701 occurs after step S602, after determining that the second link fails, the apparatus side first retransmits the to-be-transmitted data packets in advance over the first link, and then sends, to the first base station, the second message indicating that the second link fails. If step S701 and step S602 occur simultaneously, after determining that the second link fails, the apparatus side may simultaneously send the second message and perform in-advance retransmission. A sequence of step S701 and step S602 is not limited in this embodiment of this application.

S702. The first base station sends the reconfiguration message to the apparatus.

The reconfiguration message is used to indicate the link reconfigured by the first base station.

For example, after receiving the second message that is sent by the apparatus side and that indicates that the second link fails, the first base station reconfigures the second link, and sends the reconfiguration message to the apparatus. The reconfigured link may be the third link or the first link. This is not limited in this embodiment of this application.

S703. The apparatus receives the reconfiguration message from the first base station.

For example, if the reconfigured link indicated by the reconfiguration message is the third link, proceed to step S704. If the reconfigured link indicated by the reconfiguration message is the first link, proceed to step S705.

It may be understood that, after step S703, the method may further include: sending, by the apparatus, a reconfiguration complete message to the first base station, where the reconfiguration complete message is used to indicate that the apparatus has successfully received the reconfiguration message from the first base station.

S704. The apparatus sends, to the third base station over the third link, a data packet that has not been sent and that is in the to-be-transmitted data packets.

The to-be-transmitted data packets further include a to-be-newly-transmitted data packet.

For example, when the newly configured link is the third link, after receiving the reconfiguration message from the first base station, the apparatus may send, to the third base station over the newly configured third link, the data packet that has not been sent and that is in the to-be-transmitted data packets, and a data packet that has been being transmitted over the first link continues to be transmitted over the first link.

S705. The apparatus sends, to the first base station over the first link, the data packet that has not been sent and that is in the to-be-transmitted data packets.

The to-be-transmitted data packets further include the to-be-newly-transmitted data packet.

For example, when the newly configured link is the first link, after receiving the reconfiguration message from the first base station, the apparatus may continue to send, to the third base station over the newly configured first link, the data packet that has not been sent and that is in the to-be-transmitted data packets, and a data packet that has been being transmitted over the first link still continues to be transmitted over the first link.

According to the data transmission method provided in this embodiment of this application, the first data packet is transmitted over the second link. If determining that the second link fails, before receiving the reconfiguration message from the first base station, the apparatus sends the to-be-transmitted data packets to the first base station over the first link. The to-be-transmitted data packets include the data packet whose reception is not acknowledged as a success and that is in the first data packet. The apparatus receives the reconfiguration message from the first base station, and if the reconfigured link indicated by the reconfiguration message is the third link, sends, to the third base station over the third link, the data packet that has not been sent and that is in the to-be-transmitted data packets, or if the reconfigured link indicated by the reconfiguration message is the first link, sends, to the first base station over the first link, the data packet that has not been sent and that is in the to-be-transmitted data packets. According to the technical solution in this embodiment of this application, when the second link fails, the data packet whose reception is not acknowledged by the receive side as a success and that is over the second link can be retransmitted in advance over the first link. After the first base station reconfigures the link, the data packet that has not been sent and that is in the to-be-transmitted data packets continues to be transmitted over the reconfigured link, so that data transmission efficiency can be improved while the service delay is improved.

Figure 8:
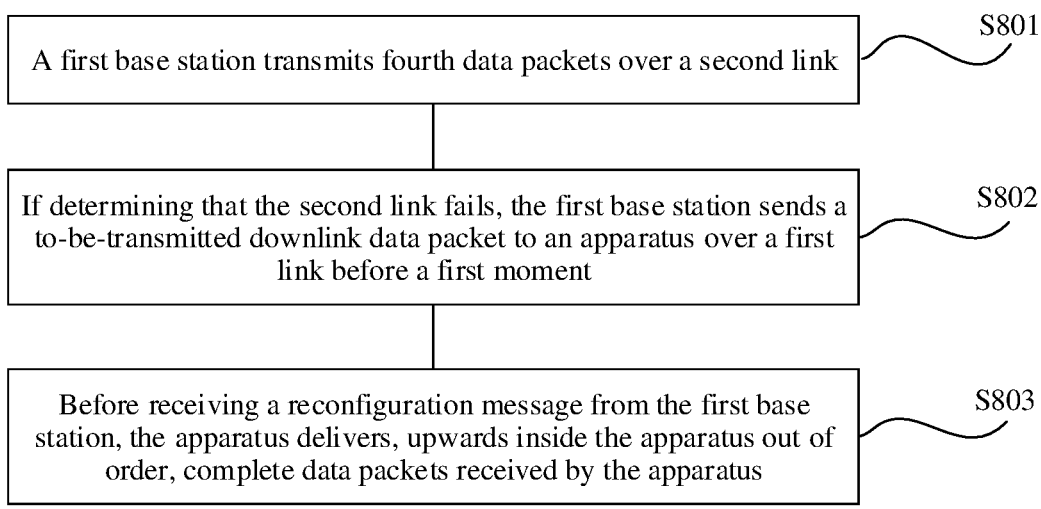
FIG. 8 is a flowchart of another data transmission method according to an embodiment of this application.

This application further provides an embodiment. As shown in FIG. 8, this application further provides a data transmission method. During downlink transmission, the method may further include steps S801 to S803.

S801. A first base station transmits fourth data packets over a second link.

For example, during downlink transmission, the first base station may transmit the fourth data packets over the second link, or may transmit the fourth data packets over both a first link and the second link. This is not limited in this embodiment of this application. It may be understood that, different from an apparatus, a base station side transmits a data packet over the first link and/or the second link without a limitation of a data volume of the data packet.

S802. If determining that the second link fails, the first base station sends a to-be-transmitted downlink data packet to the apparatus over the first link before a first moment.

The to-be-transmitted downlink data packet includes a data packet whose reception is not acknowledged by the apparatus side as a success and that is transmitted over the second link. The first moment may include a plurality of different moments. For example, the first moment may be a moment at which the first base station receives a second message sent by the apparatus (where the second message is used to indicate that the second link fails), may be a moment at which the first base station sends a reconfiguration message to the apparatus (where the reconfiguration message is used to indicate a link reconfigured by the first base station), or may be a moment at which the first base station receives a reconfiguration complete message sent by the apparatus (where the reconfiguration complete message is used to indicate that the apparatus has successfully received the reconfiguration message from the first base station). This is not limited in this embodiment of this application.

In an implementation, the determining that the second link fails may include: receiving, by the first base station, a third message sent by a second base station, and determining, based on the third message, that the second link fails, where the third message may carry status information of the second link, or the third message may be used to indicate that the second link fails. For example, RLC of the second base station may send a quantity of data packet retransmissions over the second link to the first base station, so that the second base station determines, based on the information, that the second link fails. Alternatively, RLC of the second base station may detect that a quantity of data packet retransmissions over the second link exceeds a preset maximum quantity of retransmissions, so that the second base station determines that the second link fails, and sends, to the first base station, the third message indicating that the second link fails.

In another implementation, the determining that the second link fails may further include: determining, by a second base station through detection, that the second link fails. For example, an RLC layer of the second base station detects that a quantity of data packet retransmissions over the second link exceeds a preset maximum quantity of retransmissions, and determines that the second link fails. Alternatively, an RRC layer or a physical layer of a second base station detects that a T313 timer expires, and determines that the second link fails. Alternatively, a MAC layer of a second base station detects that an uplink transmission time difference of the second link exceeds a preset maximum uplink transmission time difference, and determines that the second link fails. A specific manner of determining, by the second base station, that the second link fails is not limited in this embodiment of this application, and is merely an example for description herein.

It may be understood that, after determining that the second link fails, before receiving the second message sent by the apparatus, or before sending the reconfiguration message to the apparatus, or before receiving the reconfiguration complete message sent by the apparatus, the first base station retransmits, in advance over the first link, the data packet whose reception is not acknowledged by the apparatus as a success and that is in the fourth data packets. Compared with a conventional technology in which the first base station starts retransmission only after receiving the reconfiguration complete message, in this embodiment of this application, the to-be-transmitted downlink data packet can be retransmitted in advance, thereby effectively improving a service delay.

It should be noted that the first base station transmits the data packet over the first link and/or the second link without the limitation of the data volume of the to-be-transmitted data packet. Therefore, once the first base station determines that the second link fails, the first base station may immediately retransmit the to-be-transmitted data packet over the first link.

S803. Before receiving the reconfiguration message from the first base station, the apparatus delivers, upwards inside the apparatus out of order, complete data packets received by the apparatus.

For example, if it is determined that the second link fails, before the first base station reconfigures a link, the apparatus may deliver, upwards inside the apparatus out of order, the complete data packets received by the apparatus, so that after the apparatus receives the complete data packets, the data packets can be reordered by a PDCP layer of the apparatus in advance, data can be delivered upwards more quickly, the PDCP of the apparatus can slide a window in advance, and stacked data is reduced, to reduce memory usage of a receive side.

For example, step S803 may specifically include: An RLC layer delivers, to the PDCP layer out of order, complete data packets received by the RLC layer. The PDCP layer reorders the complete data packets received by the RLC layer. If data packets in a reordering window of the PDCP layer are continuously received completely, the reordering window of the PDCP layer is slid, and the data packets in the reordering window are delivered upwards.

It may be understood that the apparatus may include two RLC layers. One RLC layer communicates with a master eNodeB over the first link, and the other RLC layer communicates with a secondary eNodeB over the second link. The RLC layer in step S803 is the RLC layer that communicates with the secondary eNodeB over the second link.

Specifically, the RLC layer communicating with the secondary base station over the second link delivers, to the PDCP layer out of order, the complete data packets received by the RLC layer. The RLC layer transmitting data over the first link delivers, to the PDCP layer in order or out of order, complete data packets received by the RLC layer. The PDCP layer reorders the complete data packets delivered by the foregoing two RLC layers. If the reordering window of the PDCP is continuously received completely, the reordering window is slid, and the data packets in the reordering window are delivered to an application layer. Compared with the conventional technology in which an RLC layer needs to deliver data packets upwards in order, because in this embodiment of this application, the RLC layer (the RLC layer that communicates with the secondary eNodeB over the second link) may receive only some data packets, the data packets cannot be delivered upwards based on the conventional technology. Instead, according to the transmission method in this embodiment of this application, when the second link fails, the RLC (the RLC layer that communicates with the secondary eNodeB over the second link) may deliver, upwards, the complete data packets received by the RLC, so that the data packets can be reordered by the PDCP layer of the apparatus in advance, the PDCP of the apparatus can slide the window in advance, and the stacked data is reduced, to reduce memory usage of the receive side.

According to the data transmission method provided in this embodiment of this application, the first base station transmits the fourth data packets over the second link. If determining that the second link fails, the first base station sends the to-be-transmitted downlink data packet to the apparatus over the first link before the first moment. Before receiving the reconfiguration message from the first base station, the apparatus delivers, upwards out of order, the complete data packets received by the apparatus. According to the technical solution in this embodiment of this application, when determining that the second link fails, the first base station can retransmit, in advance over the first link, the data packet whose reception is not acknowledged by the apparatus as a success and that is over the second link, and deliver, upwards out of order, the complete data packets received by the apparatus, so that reordering duration on the receive side is reduced, the service delay is reduced, and data transmission efficiency is improved.

The foregoing mainly describes, from a perspective of the steps of the methods, the solutions provided in the embodiments of the present invention. It may be understood that, to implement the foregoing functions, a computer includes corresponding hardware structures and/or software modules for performing the functions. A person skilled in the art should be easily aware that, in combination with units and algorithm steps of the examples described in the embodiments disclosed in this specification, this application may be implemented by a combination of hardware and computer software. A person skilled in the art may use different methods to implement the described functions for each particular application, but it should not be considered that the implementation goes beyond the scope of the present invention.

In the embodiments of this application, the computer may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that in the embodiments of the present invention, division into the modules is an example and is merely logical function division, and may be other division in an actual implementation.

Figure 9:
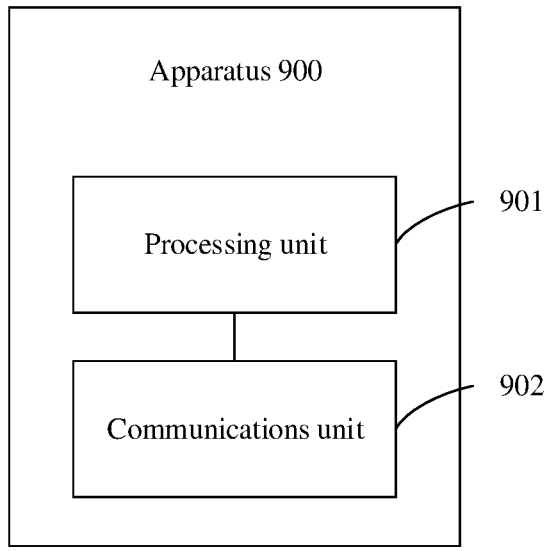
FIG. 9 is a schematic composition diagram of an apparatus according to an embodiment of this application.

When function modules are obtained through division based on corresponding functions, FIG. 9 is a possible schematic structural diagram of the apparatus in the foregoing embodiments. As shown in FIG. 9, the apparatus 900 includes a processing unit 901 and a communications unit 902. The processing unit 901 is configured to: determine whether a second link fails, and when the second link fails, perform, by using the communications unit 902, S601 and S602 in FIG. 6, S701 and S703 to S705 in FIG. 7, S803 in FIG. 8, and/or another process in the technology described in this specification. It should be noted that all related content of the steps in the foregoing method embodiments may be cited in function descriptions of corresponding function modules. Details are not described herein again.

Figure 10:
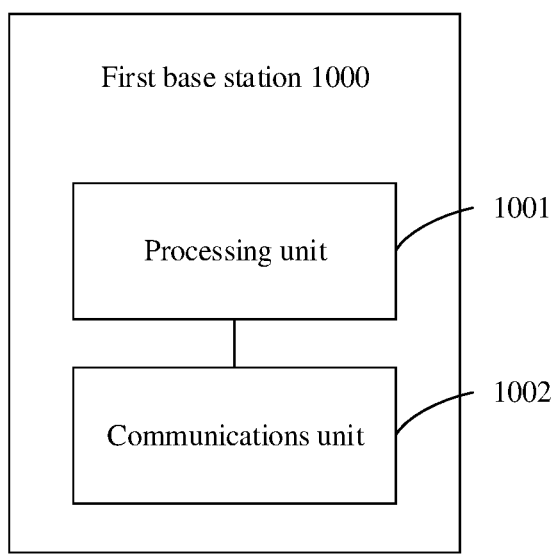
FIG. 10 is a schematic composition diagram of a first base station according to an embodiment of this application.

When function modules are obtained through division based on corresponding functions, FIG. 10 is a possible schematic structural diagram of the first base station in the foregoing embodiments. The first base station 1000 includes a processing unit 1001 and a communications unit 1002. The processing unit 1001 is configured to: support the first base station in determining, through detection, whether a second link fails, and when the second link fails, perform, by using the communications unit 1002, S603 in FIG. 6, steps S6041a, S6041c, S6041d, and S6042a in the foregoing embodiment, S702 in FIG. 7, or S801 and S802 in FIG. 8, and/or another process in the technology described in this specification. It should be noted that all related content of the steps in the foregoing method embodiments may be cited in function descriptions of corresponding function modules. Details are not described herein again.

Figure 11:
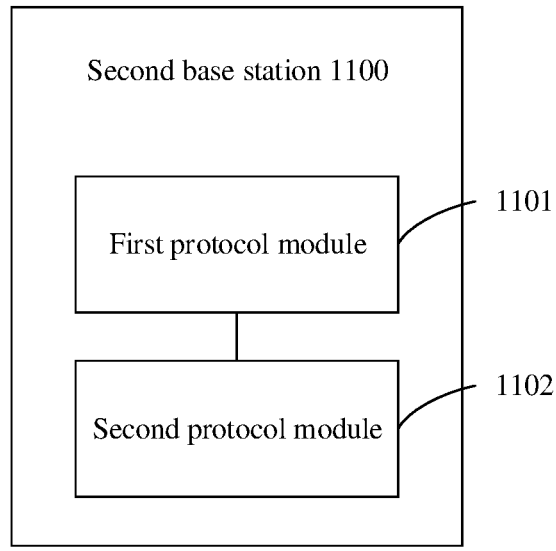
FIG. 11 is a schematic composition diagram of a second base station according to an embodiment of this application.

When function modules are obtained through division based on corresponding functions, FIG. 11 is a possible schematic structural diagram of the second base station in the foregoing embodiments. The second base station 1100 includes a first protocol module 1101 and a second protocol module 1102. The first protocol module 1101 is configured to support the second base station in performing step 6041b and step 6042c in the foregoing embodiments, and/or another process in the technology described in this specification. The second protocol module 1102 is configured to support the second base station in performing step 6042b and step 6042d in the foregoing embodiments. It should be noted that all related content of the steps in the foregoing method embodiments may be cited in function descriptions of corresponding function modules. Details are not described herein again.

Figure 12:
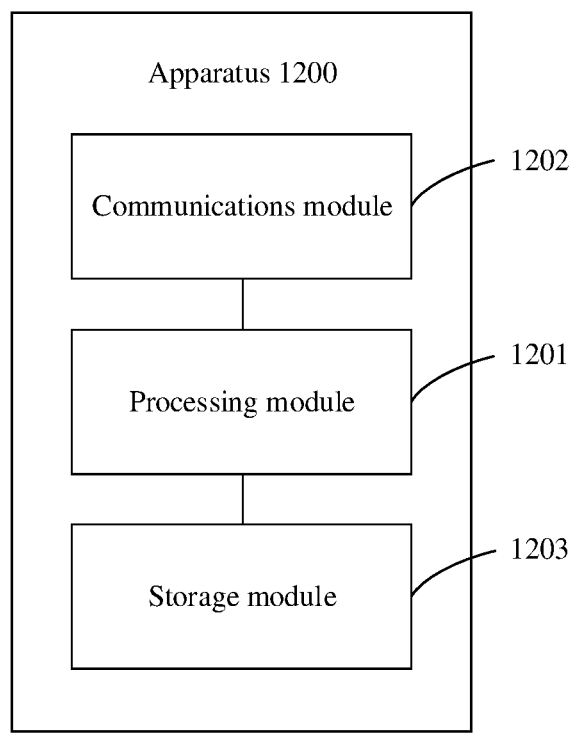
FIG. 12 is a schematic composition diagram of another apparatus according to an embodiment of this application.

When an integrated unit is used, FIG. 12 is a possible schematic structural diagram of the apparatus in the foregoing embodiments. The apparatus 1200 includes a processing module 1201 and a communications module 1202. The processing module 1201 is configured to control and manage actions of the apparatus 1200, for example, perform the step performed by the foregoing processing unit 901, and/or another process in the technology described in this specification. The communications module 1202 is configured to perform the step performed by the foregoing communications unit 902, to support interaction between the apparatus and another device, for example, interaction between the apparatus and a second device. As shown in FIG. 12, the apparatus 1200 may further include a storage module 1203. The storage module 1203 is configured to store program code and data of the apparatus. When the processing module 1201 is a processor, the communications module 1202 is a transceiver, and the storage module 1203 is a memory, descriptions of all related content of the components in FIG. 5 may be cited in function descriptions of corresponding components in FIG. 12. Details are not described herein again.

Method or algorithm steps described in combination with the content disclosed in this application may be implemented by hardware, or may be implemented by a processor by executing software instructions. The software instructions may include corresponding software modules. The software modules may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information to the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the one or more examples, functions described in the present invention may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose computer or a dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method, comprising:
    transmitting, by an apparatus, one or more first data packets over a second link, wherein the apparatus is connected to a first base station over a first link, and the apparatus is connected to a second base station over the second link; and
    in response to determining that the second link fails, sending, by the apparatus, to-be-transmitted data packets to the first base station over the first link, wherein the to-be-transmitted data packets comprise one or more second data packets that are comprised in the one or more first data packets and whose reception have not been acknowledged as a success, and wherein the to-be-transmitted data packets further comprise one or more to-be-newly-transmitted data packets;
    after sending the to-be-transmitted data packets including the one or more second data packets and the one or more to-be-newly-transmitted data packets to the first base station over the first link, sending, by the apparatus, a first message to the first base station, wherein the first message indicates that the second link fails; and
    after sending the first message, receiving, by the apparatus, a reconfiguration message from the first base station, wherein the reconfiguration message indicates a reconfigured link, and the reconfigured link is reconfigured in response to the second link failing.

2. The method according to claim 1, wherein the first base station is configured to provide a first service for a master cell group (MCG), and the second base station is configured to provide a second service for a secondary cell group (SCG).

3. The method according to claim 1, wherein in response to determining that the second link fails, sending, by the apparatus, the to-be-transmitted data packets to the first base station over the first link, and after sending the to-be-transmitted data packets to the first base station over the first link, receiving, by the apparatus, the reconfiguration message from the first base station, comprises:
    in response to the apparatus determining that the second link fails, and that a data volume of the to-be-transmitted data packets is greater than or equal to a first preset threshold, sending the to-be-transmitted data packets to the first base station over the first link; and
    after sending the to-be-transmitted data packets to the first base station over the first link, receiving, by the apparatus, the reconfiguration message from the first base station.

4. The method according to claim 1, wherein in response to determining that the second link fails, sending, by the apparatus, the to-be-transmitted data packets to the first base station over the first link, and after sending the to-be-transmitted data packets to the first base station over the first link, receiving, by the apparatus, the reconfiguration message from the first base station comprises:
    in response to determining that the second link fails, sending, by the apparatus, the to-be-transmitted data packets to the first base station over the first link based on first indication information, wherein the first indication information indicates to the apparatus to autonomously transmit the to-be-transmitted data packets over the first link when the second link fails; and
    after sending the to-be-transmitted data packets to the first base station over the first link, receiving, by the apparatus, the reconfiguration message from the first base station.

5. The method according to claim 1, further comprising:
    before the apparatus receives the reconfiguration message from the first base station, delivering, by the apparatus, from a lower layer to an upper layer, out of order, complete data packets received by the apparatus.

6. The method according to claim 5, wherein the apparatus comprises a radio link control protocol (RLC) layer and a packet data convergence protocol (PDCP) layer, and delivering, by the apparatus from the lower layer to the upper layer, out of order, complete data packets received by the apparatus, comprises:
    delivering, by the RLC layer to the PDCP layer, the out of order, complete data packets received by the RLC layer;
    reordering, by the PDCP layer, the complete data packets received by the RLC layer; and
    in response to data packets in a reordering window of the PDCP layer being continuously and completely received, sliding the reordering window of the PDCP layer, and delivering the data packets in the reordering window upwards.

7. The method according to claim 1, wherein the reconfiguration message indicates that the reconfigured link is a third link, the third link is between the apparatus and a third base station, and the method further comprises:
    receiving, by the apparatus, the reconfiguration message from the first base station; and
    sending, to the third base station over the third link, a third data packet that has not previously been sent and that is in the to-be-transmitted data packets, the one or more to-be-newly-transmitted data packets comprising the third data packet.

8. The method according to claim 1, wherein the reconfiguration message indicates that the reconfigured link is the first link, and the method further comprises:
    receiving, by the apparatus, the reconfiguration message from the first base station; and
    sending, to the first base station over the first link, a third data packet that has not previously been sent and that is in the to-be-transmitted data packets, the one or more to-be-newly-transmitted data packets comprising the third data packet.

9. The method according to claim 1, wherein the second link failing comprises a quantity of data packet retransmissions over the second link exceeding a preset maximum quantity of retransmissions, a T313 timer for the second link expiring, or an uplink transmission time difference of the second link exceeding a preset maximum uplink transmission time difference.

10. An apparatus, comprising:
at least one processor; and
a transceiver;
wherein the at least one processor is configured to:
transmit one or more first data packets over a second link using the transceiver, wherein the apparatus is connected to a first base station over a first link, and the apparatus is connected to a second base station over the second link;
determine whether the second link fails;
in response to determining that the second link fails, send to-be-transmitted data packets to the first base station over the first link using the transceiver, wherein the to-be-transmitted data packets comprise one or more second data packets whose reception have not acknowledged as a success and that are comprised in the one or more first data packets, and wherein the to-be-transmitted data packets further comprise one or more to-be-newly-transmitted data packets;
after sending the to-be-transmitted data packets including the one or more second data packets and the one or more to-be-newly-transmitted data packets to the first base station over the first link, send, using the transceiver, a first message to the first base station, wherein the first message indicates that the second link fails; and
after sending the first message, receive, using the transceiver, a reconfiguration message from the first base station, wherein the reconfiguration message indicates a reconfigured link, and the reconfigured link is reconfigured in response to the second link failing.

11. The apparatus according to claim 10, wherein the at least one processor is configured to:
in response determining that the second link fails, and that a data volume of the to-be-transmitted data packets is greater than or equal to a first preset threshold, send the to-be-transmitted data packets to the first base station over the first link using the transceiver; and
after sending the to-be-transmitted data packets to the first base station over the first link, receive, using the transceiver, the reconfiguration message from the first base station.

12. The apparatus according to claim 10, wherein the at least one processor is further configured to:
in response to determining that the second link fails, send the to-be-transmitted data packets to the first base station over the first link based on first indication information, wherein the first indication information indicates to autonomously transmit the to-be-transmitted data packets over the first link when the second link fails; and
after sending the to-be-transmitted data packets to the first base station over the first link, receive, using the transceiver, the reconfiguration message from the first base station.

13. The apparatus according to claim 10, wherein the at least one processor is further configured to:
deliver, from a lower layer to an upper layer, and out of order, complete data packets received by the transceiver.

14. The apparatus according to claim 13,
wherein the apparatus comprises a radio link control protocol (RLC) layer and a packet data convergence protocol (PDCP) layer, and wherein the at least one processor is further configured to:
delivering, by the RLC layer to the PDCP layer the out of order, complete data packets received by the RLC layer;
reordering, by the PDCP layer, the complete data packets received by the RLC layer; and
in response to data packets in a reordering window of the PDCP layer being continuously and completely received, sliding the reordering window of the PDCP layer, and delivering the data packets in the reordering window upwards.

15. The apparatus according to claim 10, wherein:
the reconfiguration message indicates that the reconfigured link is a third link, and the third link is between the apparatus and a third base station; and
the at least one processor is further configured to:
receive, using the transceiver, the reconfiguration message from the first base station; and
send, to the third base station over the third link, a third data packet that has not previously been sent and that is in the to-be-transmitted data packets, the one or more to-be-newly-transmitted data packets comprising the third data packet.

16. The apparatus according to claim 10, wherein:
the reconfiguration message indicates that the reconfigured link is the first link; and
the at least one processor is further configured to:
receive, using the transceiver, the reconfiguration message from the first base station; and
send, to the first base station over the first link, a third data packet that has not been sent and that is in the to-be-transmitted data packets, the one or more to-be-newly-transmitted data packets comprising the third data packet.

17. The apparatus according to claim 10, wherein the second link failing comprises a quantity of data packet retransmissions over the second link exceeding a preset maximum quantity of retransmissions, a T313 timer for the second link expiring, or an uplink transmission time difference of the second link exceeding a preset maximum uplink transmission time difference.

18. A non-transitory computer storage medium, wherein the non-transitory computer storage medium stores computer program code, and when the computer program code is run on at least one processor of an apparatus, the at least one processor is enabled to cause the apparatus to:
transmit one or more first data packets over a second link, wherein the apparatus is connected to a first base station over a first link, and the apparatus is connected to a second base station over the second link;
determine whether the second link fails;
in response to determining that the second link fails, send to-be-transmitted data packets to the first base station over the first link, wherein the to-be-transmitted data packets comprise one or more second data packets whose reception have not acknowledged as a success and that are comprised in the one or more first data packets, and wherein the to-be-transmitted data packets further comprise one or more to-be-newly-transmitted data packets;
after sending the to-be-transmitted data packets including the one or more second data packets and the one or more to-be-newly-transmitted data packets to the first base station over the first link, send a first message to the first base station, wherein the first message indicates that the second link fails; and after sending the first message, receive a reconfiguration message from the first base station, wherein the reconfiguration message indicates a reconfigured link, and the reconfigured link is reconfigured in response to the second link failing.

* * * * *